US012785902B2

(12) United States Patent
Zhang et al.

(10) Patent No.: US 12,785,902 B2
(45) Date of Patent: Nov. 3, 2026

(54) ACKNOWLEDGEMENT OF BEAM REPORT

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/777,301

(22) PCT Filed: Aug. 6, 2021

(86) PCT No.: PCT/CN2021/111158
§ 371 (c)(1),
(2) Date: Feb. 9, 2023

(87) PCT Pub. No.: WO2023/010518
PCT Pub. Date: Feb. 9, 2023

(65) Prior Publication Data

US 2024/0171356 A1 May 23, 2024

(51) Int. Cl.
*H04W 72/231* (2023.01)
*H04L 1/1867* (2023.01)
*H04L 5/00* (2006.01)

(52) U.S. Cl.
CPC .......... *H04L 5/0055* (2013.01); *H04L 1/1887* (2013.01); *H04W 72/231* (2023.01)

(58) Field of Classification Search
CPC ... H04L 5/0055; H04L 1/1887; H04W 72/231
See application file for complete search history.

(56) References Cited

U.S. PATENT DOCUMENTS

2018/0049172 A1* 2/2018 Lee ........................ H04W 72/23
2018/0123742 A1* 5/2018 Yi .......................... H04W 72/23
(Continued)

FOREIGN PATENT DOCUMENTS

CN 110073609 A 7/2019
CN 111316739 A 6/2020
(Continued)

OTHER PUBLICATIONS

3GPP TSG RAN WG1 #105-e meeting, R1-2105296, Title: "Moderator summary for offline discussion on multi-beam enhancement: CA QCL and unified TCI for 'other signals/channels'"; Source: Samsung; May 2021 (Year: 2021).*
(Continued)

*Primary Examiner* — Joseph E Avellino
*Assistant Examiner* — Lucia G Gradinariu
(74) *Attorney, Agent, or Firm* — Eschweiler & Potashnik, LLC; Matthew Glause

(57) ABSTRACT

A user equipment (UE), baseband processor or other network device (e.g., base station, next generation NodeB, etc.) can operate to process or generate an acknowledgement (ACK) or a non-acknowledgement (NACK) of a beam report to indicate an autonomous transmission configuration indicator (TCI) state update, which can be a TCI update without a corresponding TCI indication/trigger. The UE can determine the ACK/NACK in response to providing the beam report in the autonomous TCI state update. The UE can then activate a TCI state of the autonomous TCI state update in response to identifying the ACK or re-transmit the beam report for autonomous TCI state update when a NACK is recognized.

23 Claims, 11 Drawing Sheets

(56) References Cited

U.S. PATENT DOCUMENTS

| | | | | |
|---|---|---|---|---|
| 2018/0219665 | A1* | 8/2018 | Yu | H04L 1/1812 |
| 2019/0081763 | A1* | 3/2019 | Akkarakaran | H04L 1/0026 |
| 2019/0260458 | A1 | 8/2019 | Zhou | |
| 2020/0028613 | A1* | 1/2020 | Nam | H04L 27/26025 |
| 2020/0260439 | A1* | 8/2020 | Salem | H04W 72/0446 |
| 2021/0160964 | A1 | 5/2021 | Sun | |
| 2021/0227530 | A1 | 7/2021 | Farag et al. | |
| 2022/0124739 | A1* | 4/2022 | Bai | H04W 72/542 |
| 2022/0361247 | A1* | 11/2022 | Awad | H04L 5/0048 |
| 2023/0292335 | A1* | 9/2023 | Park | H04B 7/0404 |
| 2023/0362817 | A1* | 11/2023 | Da Silva | H04W 24/10 |
| 2023/0396375 | A1* | 12/2023 | Muruganathan | H04L 5/0023 |
| 2024/0032036 | A1* | 1/2024 | Farag | H04B 7/088 |
| 2024/0430891 | A1* | 12/2024 | Park | H04B 7/06952 |

FOREIGN PATENT DOCUMENTS

| | | | |
|---|---|---|---|
| CN | 111656839 | A | 11/2020 |
| CN | 112075029 | A | 11/2020 |
| CN | 112839381 | A | 5/2021 |
| WO | 2019093764 | A1 | 5/2019 |
| WO | 2019140256 | A1 | 7/2019 |
| WO | 2019193581 | A1 | 10/2019 |
| WO | 2019068255 | A1 | 11/2019 |

OTHER PUBLICATIONS

3GPP TS 38.306 V16.5.0 (Jun. 2021), âTechnical Specification Group Radio Access Network; NR; User Equipment (UE) radio access capabilities (Release 16)â; (Year: 2021).*

International Preliminary Report on Patentability dated Feb. 6, 2024 in connection with Application Serial No. PCT/CN2021/111158.

3rd Generation Partnership Project; Technical Specification Group Radio Access Network; NR; Multiplexing and channel coding; (Release 16); 3GPP TS 38.212 V16.6.0 (Jun. 2021); http://www.3gpp.org.

3rd Generation Partnership Project; Technical Specification Group Radio Access Network; NR; Physical layer procedures for data; (Release 16); 3GPP TS 38.214 V16.6.0 (Jun. 2021); http://www.3gpp.org.

3rd Generation Partnership Project; Technical Specification Group Radio Access Network; NR; Radio Resource Control (RRC) protocol specification; (Release 16); 3GPP TS 38.331 V16.5.0 (Jun. 2021); http://www.3gpp.org.

3rd Generation Partnership Project; Technical Specification Group Radio Access Network; NR; Medium Access Control (MAC) protocol specification; (Release 16); 3GPP TS 38.321 V16.5.0 (Jun. 2021); http://www.3gpp.org.

PCT Search Report dated Feb. 18, 2022 in connection with PCT Application No. PCT/CN2021/111158.

PCT Written Opinion dated Mar. 23, 2022 in connection with PCT Application No. PCT/CN2021/111158.

Mediatek Inc. Enhancement on multi-beam operation 3GPP TSG RAN WG1 #104b-e R1-2102675 Apr. 20, 2021 (Apr. 20, 2021).

Interdigital, Inc. Remaining Issued on Rel-17 Multi-beam Operation 3GPP TSG RAN WG1 #105-e R1-2104292 May 27, 2021(May 27, 2021).

Lenovo et al. Enhancements on Multi-beam Operation 3GPP TSG RAN WG1 #105-e R1-2104404 May 27, 2021 (May 27, 2021).

3rd Generation Partnership Project; Technical Specification Group Radio Access Network; NR; Requirements for support of radio resource management (Release 17); 3GPP TS 38.133 V17.2.0 (Jun. 2021).

Wenjing Ren; Thesis for Master Degree: Research On Beam Management of 5G Mutil Antenna System in High Frequency and High Speed Scenario; May 30, 2020.

Chinese Office Action dated Apr. 4, 2026 in connection with Application No. 202180006576.7.

Chinese Notice of Grant dated Aug. 28, 2026 in connection with Application No. 202180006576.7.

* cited by examiner

ACKNOWLEDGEMENT OF BEAM REPORT

This application is a National Phase entry application of International Patent Application No. PCT/CN2021/111158 filed Aug. 6, 2021, entitled "ACKNOWLEDGEMENT OF BEAM REPORT", the contents of which are herein incorporated by reference in their entirety.

FIELD

The present disclosure relates to wireless technology including beam reporting and the acknowledgement for beam report operations.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

Load balancing is achieved in new radio (NR) 5G networks with handover operations, redirection mechanisms upon radio resource control (RRC) signaling release and through the usage of inter-frequency and inter-radio access technology (RAT) priorities and offset parameters. However, signaling such as RRC signaling at the network layer includes a long handover latency, a long interruption time during the handover, and a heavy signaling overhead. Thus, handover mechanisms do not always satisfy the objectives for fast cell change with high frequencies in 5G networks. As such, there is a demand for enhancement on the signaling mechanisms for handover to improve handover latency and efficiency by increasing the usage of dynamic control signaling.

DETAILED DESCRIPTION

Figure 1:
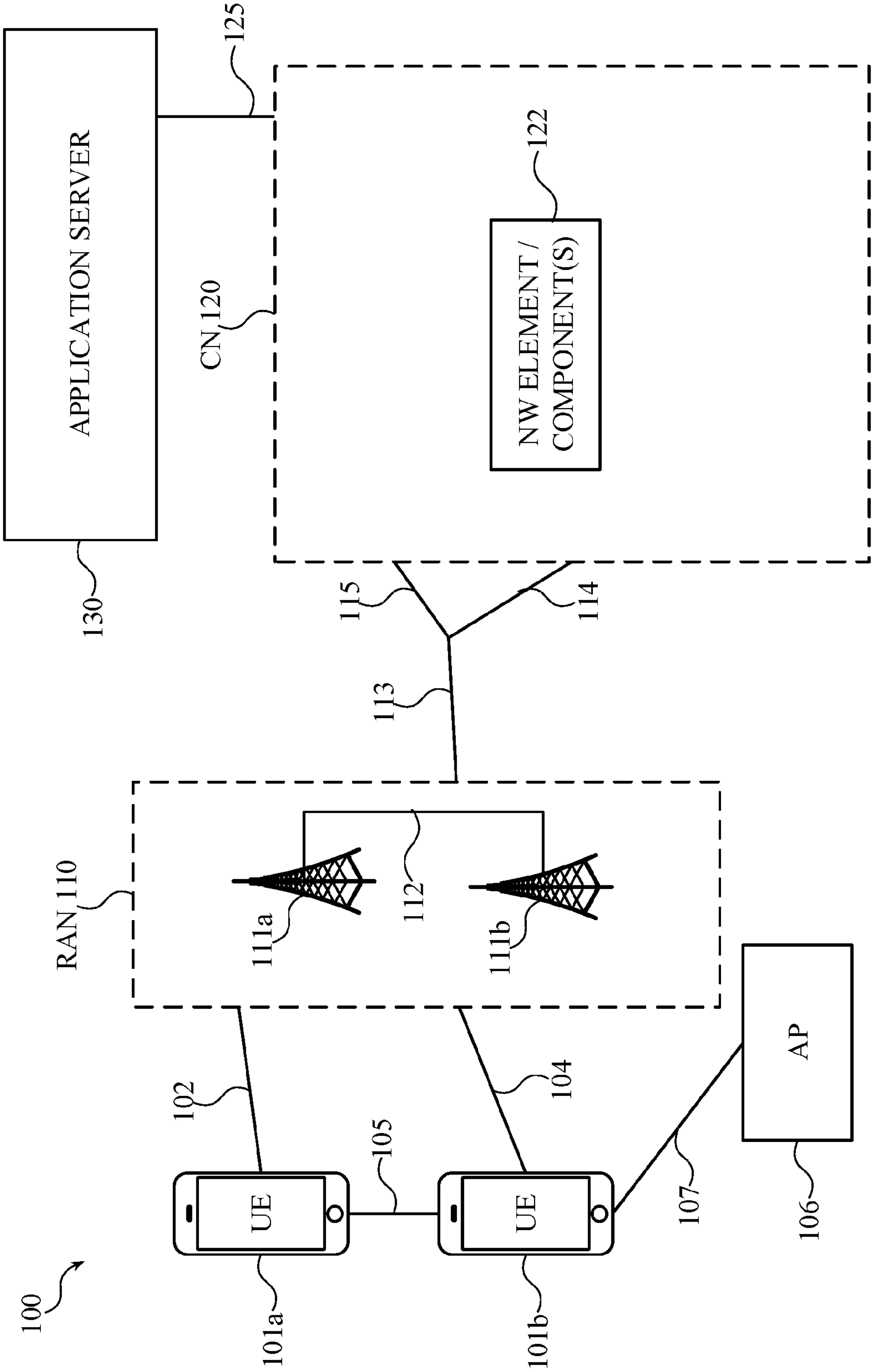
FIG. 1 illustrates an exemplary block diagram illustrating an example of user equipment(s) (UEs) communicatively coupled a network with network components as peer devices useable in connection with various embodiments (aspects) described herein.

In consideration of various concerns regarding enhancement on the signaling mechanisms for acknowledgement and non-acknowledgement of a beam report based on autonomous transmission configuration indicator (TCI) state updating, TCI updates without a beam indication can cause potential mismatch issues deriving from a base station (e.g., gNodeB (gNB)) or other network device of a serving cell not decoding a beam report transmission correctly for autonomous TCI state update processes. To remedy or prevent such mismatch, acknowledgement and non-acknowledgement signaling aspects for configuring autonomous TCI state updating through beam reports are disclosed.

Beam reports (e.g., layer 1 (L1) L1-reference signal received power (RSRP)/L1-signal to noise interference ratio (SINR) reports) can be transmitted by a physical uplink control channel (PUCCH) or a physical uplink shared channel (PUSCH) with the various schemes. For example, a beam report can be transmitted in a first scheme by a PUCCH or in a second scheme via an uplink control information (UCI) and multiplexed with a PUSCH.

The action delay for updating a Transmission Configuration Indicator (TCI) state can depend on whether the beam has a known/unknown status of a TCI. A beam or TCI state can be known if different conditions are satisfied. When the TCI is known, the beam is measured or reported with a beam time window. The beam is to have at least one beam report for the TCI state and the SNR of the TCI state above −3 dB. These make up three conditions for a TCI to be considered known, otherwise the beam is considered unknown. The action delay for the unknown TCI states can be considerably long to account for the time for the UE to track unknown beams.

In an autonomous TCI state update or beam report based TCI indication, the TCI state can be updated without a TCI indication or identifier being signaled to cause the TCI state switch or TCI update. Rather than a TCI state update being configured by a signaled identifier or trigger that enables beam switching to an associated TCI state, a UE can update the TCI state by providing the beam report to the network or base station autonomously. After the UE reports the beam with the TCI state in the beam report, both the UE and gNB ideally change the beam without having utilized any additional TCI indication/identifier signaling. However, mechanisms or configurations for ACK/NACK of the beam report for autonomous TCI state updating can be lacking. In particular, if the beam report is not properly received or decoded by the base station (gNB), even though the UE reports the beam, a beam mismatch could occur. If a mismatch results, the gNB may not change/switch the beam to match the target beam that UE has updated to. Therefore, efficient and dynamic signaling to prevent unknown mismatching, with ACK/NACK indication from the base station, action delay and UE behavior for the TCI update without a TCI indication or trigger, as well as new mechanism for the beam report are configured.

In an aspect, ACK/NACK mechanisms are configured for autonomous TCI state updating through a beam report from the UE. Additionally, or alternatively, the UE behavior and action delay for a TCI state update without a TCI indication/identifier being signaled to the UE or autonomous TCI state updating can be configured according to ACK/NACK signaling mechanisms. In response to identifying the ACK/NACK from signaling in response to the reported beam in the beam report, the UE can determine whether the beam report has been received and decoded. Then the UE can activate the updated TCI state of an autonomous TCI state update based on the ACK or re-transmit the beam report based on the NACK.

An ACK can be transmitted based on a specific radio network temporary identifier (RNTI) that can be predefined, configured via radio resource control (RRC) signaling or higher layer signaling. For example, the gNB can generate the ACK as a function of an acknowledgement RNTI (ACK-RNTI). Based on a predefined configuration, or RRC signaling, the UE can decode the transmission following the beam report to identify an ACK or NACK with the ACK-RNTI, for example.

Alternatively, or additionally, the ACK/NACK can be transmitted based on a legacy downlink control information (DCI) format, such as a DCI used to schedule the physical downlink shared channel (PDSCH) or a physical uplink shared channel (PUSCH).

Alternatively, or additionally, the ACK/NACK can be transmitted via PDCCH in a dedicated search space (SS) or a control resource set (CORESET).

Alternatively, or additionally, the ACK/NACK can be transmitted by a medium access control (MAC) control element (MAC CE).

Alternatively, or additionally, the ACK/NACK can be determined based on a timer operation.

Alternatively, or additionally, the beam report can be transmitted by the UE via a MAC CE.

Alternatively, or additionally, the action delay for the UE behavior can be configured for activating the TCI state associated with the beam report after identifying the ACK.

Alternatively, or additionally, the beam report can be generated according to measurements on a synchronization signal block (SSB) or a channel state information reference signal (CSI-RS).

Alternatively, or additionally, the gNB or the UE can configure the beam report specifically for a downlink (DL) TCI update only, an uplink (UL) TCI update, or both.

Additional aspects and details of the disclosure are further described below with reference to figures.

FIG. 1 illustrates example architecture of a system 100 of a network, in accordance with various embodiments (aspects). The following description is provided for an example system 100 that can be in conjunction with the LTE system standards and 5G or NR system standards as provided by 3GPP technical specifications. However, the example embodiments are not limited in this regard and the described embodiments can apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101*a* and UE 101*b* (collectively referred to as "UEs 101" or "UE 101"). In this example, UEs 101 are illustrated as smartphones (e.g., handheld touchscreen mobile computing devices connectable to one or more cellular networks), but can comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some embodiments, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In embodiments, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface/layer.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111, 112, or other network nodes) that can be connected via non-ideal backhaul, one providing NR access and the other one providing either E-UTRA for LTE or NR access for 5G, for example. One node can act as a master node (MN) and the other as the secondary node (SN). The MN and SN can be connected via a network interface and at least the MN is connected to the core network 120. At least one of the MN or the SN can be operated with shared spectrum channel access. All functions specified for a UE can be used for an integrated access and backhaul mobile termination (IAB-MT). Similar for UE 101, the IAB-MT can access the network using either one network node or using two different nodes with EN-DC architectures, NR-DC architectures, or the like.

In MR-DC, a group of serving cells associated with a master Node can be configured as a master cell group (MCG), comprising of a special cell (SpCell) as a primary cell (PCell) and optionally one or more secondary cells (SCells). An MCG can be the radio access node that provides the control plane connection to the core network (CN) 120; it may be a Master eNB (in EN-DC), a Master ng-eNB (in NGEN-DC) or a Master gNB (in NR-DC and NE-DC), for example. SpCell can either refer to the PCell of the MCG or the primary secondary cell (PSCell) of a second cell group (SCG) depending on if the MAC entity that is associated to the MCG or the SCG, respectively. An SpCell can refer to a PCell of MCG or an SCG. A SCG in MR-DC can be a group of serving cells associated with an SN, comprising of the SpCell as an PSCell and optionally one or more SCells.

In this example, the connections 102 and 104 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 3GPP LTE protocol, a 5G protocol, a NR protocol, and/or any of the other communications protocols discussed herein. In embodiments, the UEs 101 can directly exchange communication data via a ProSe interface 105. The ProSe interface 105 can alternatively be referred to as a SL interface 105 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 101*b* is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101*b*, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101*b* in radio resource control RRC_CONNECTED being configured by a RAN node 111*a-b* to utilize radio resources of LTE and WLAN. LWIP operation can involve the UE 101*b* using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access nodes (AN)s or RAN nodes 111*a* and 111*b* (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 5G system 100 (e.g., next generation NodeB (gNB). According to various embodiments, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or part of the RAN nodes 111 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications.

In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. Additionally, or alternatively, one or more of the RAN nodes 111 can be next generation eNBs (ng-eNBs), which are RAN nodes that provide E-UTRA user plane and control plane protocol terminations toward the UEs 101, and are connected to a 5GC via an NG interface.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 3.8 GHz, whereas the unlicensed spectrum can include the 5 GHz band.

The PDSCH carries user data and higher-layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101*b* within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, 8, 16).

In aspects where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this embodiment, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In aspects, the CN 120 can be a 5GC (referred to as "5GC 120" or the like), and the RAN 110 can be connected with the CN 120 via an NG interface 112. In embodiments, the NG interface 112 can be split into two parts, a Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs).

In aspects, where CN 120 is an EPC (referred to as "EPC 120" or the like), the RAN 110 can be connected with the CN 120 via an S1 interface 112. In embodiments, the S1 interface 112 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Core NW elements/components 122 can include one or more of the following functions and network components: an Authentication Server Function (AUSF); an Access and Mobility Management Function (AMF); a Session Management Function (SMF); a Network Exposure Function (NEF); a Policy Control Function (PCF); a Network Repository Function (NRF); a Unified Data Management (UDM); an Application Function (AF); a User Plane (UP) Function (UPF); and a Network Slice Selection Function (NSSF).

The UPF, for example, can act as an anchor point for intra-RAT and inter-RAT mobility, an external Protocol Data Unit (PDU) session point of interconnect to Data Network (DN), and a branching point to support multi-homed PDU session. The UPF can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF can include an uplink classifier to support routing traffic flows to a data network. A DN can be various network operator services, Internet access, or third-party services, include, or be similar to, an application server. The UPF can interact with the SMF via an N4 reference point between the SMF and the UPF.

The AUSF, for example, can store data for authentication of UE 101 and handle authentication-related functionality. The AUSF can facilitate a common authentication framework for various access types. The AUSF can communicate with the AMF via an N12 reference point between the AMF and the AUSF; and can communicate with the UDM via an N13 reference point between the UDM and the AUSF. Additionally, the AUSF can exhibit an Nausf service-based interface.

The AMF, for example, can be responsible for registration management (e.g., for registering UE 101, etc.), connection management, reachability management, mobility management, and lawful interception of AMF-related events, and access authentication and authorization. The AMF can be a termination point for the N11 reference point between the AMF and the SMF. The AMF can provide transport for SM messages between the UE 101 and the SMF, and act as a transparent proxy for routing SM messages. AMF can also provide transport for SMS messages between UE 101 and a Short Message Service (SMS) Function (SMSF). AMF can act as Security Anchor Function (SEAF), which can include interaction with the AUSF and the UE 101 and/or receipt of an intermediate key that was established as a result of the UE 101 authentication process. Where Universal Subscriber Identity Module (USIM) based authentication is used, the AMF can retrieve the security material from the AUSF. AMF can also include a Single-Connection Mode (SCM) function, which receives a key from the SEA that it uses to derive access-network specific keys. Furthermore, AMF can be a termination point of a RAN Control Plane (CP) interface, which can include or be an N2 reference point between the (R)AN 110 and the AMF; and the AMF can be a termination point of Non Access Stratum (NAS) (N1) signaling, and perform NAS ciphering and integrity protection.

AMF can also support NAS signaling with a UE 101 over a non-3GPP (N3) Inter Working Function (IWF) interface. The N3IWF can be used to provide access to untrusted entities. N3IWF can be a termination point for the N2 interface between the (R)AN 110 and the AMF for the control plane, and can be a termination point for the N3 reference point between the (R)AN 110 and the UPF for the user plane. As such, the AMF can handle N2 signaling from the SMF and the AMF for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF via an N1 reference point between the UE 101 and the AMF, and relay uplink and downlink user-plane packets between the UE 101 and UPF. The N3IWF also provides mechanisms for IPsec tunnel establishment with the UE 101. The AMF can exhibit an Namf service-based interface, and can be a termination point for an N14 reference point between two AMFs and an N17 reference point between the AMF and a 5G Equipment Identity Register (5G-EIR) (not shown in FIG. 1).

The UE 101 can be registered with the AMF in order to receive network services. Registration Management (RM) is used to register or deregister the UE 101 with the network (e.g., AMF), and establish a UE context in the network (e.g., AMF). The UE 101 can operate in an RM-REGISTERED state or an RM-DEREGISTERED state. In the RM-DEREGISTERED state, the UE 101 is not registered with the network, and the UE context in AMF holds no valid location or routing information for the UE 101 so the UE 101 is not reachable by the AMF. In the RM-REGISTERED state, the UE 101 is registered with the network, and the UE context in AMF can hold a valid location or routing information for the UE 101 so the UE 101 is reachable by the AMF. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF can store one or more RM contexts for the UE 101, where each RM context is associated with a specific access to the network. The RM context can be a data structure, database object, etc. that indicates or stores, inter alia, a registration state per access type and the periodic update timer. The AMF can also store a 5GC Mobility Management (MM) context that can be the same or similar to an (Enhanced Packet System (EPS))MM ((E)MM) context. In various embodiments, the AMF can store a Coverage Enhancement (CE) mode B Restriction parameter of the UE 101 in an associated MM context or RM context. The AMF can also derive the value, when needed, from the UE's usage setting parameter already stored in the UE context (and/or MM/RM context).

Figure 2:
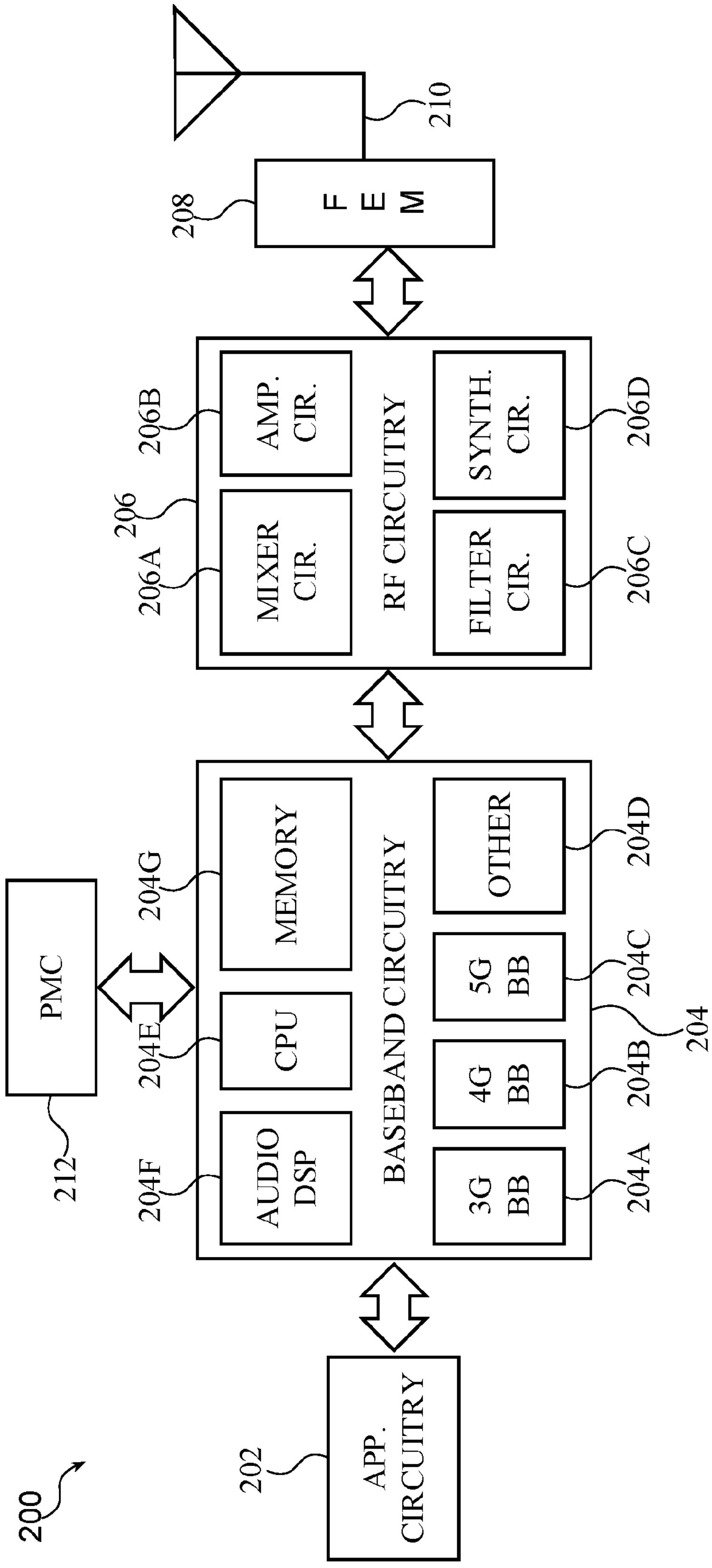
FIG. 2 illustrates a diagram illustrating example components of a device that can be employed in accordance with various aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node cannot utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EUTRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206*a*, amplifier circuitry 206*b* and filter circuitry 206*c*. In some aspects, the transmit signal path of the RF circuitry 206 can include filter circuitry 206*c* and mixer circuitry 206*a*. RF circuitry 206 can also include synthesizer circuitry 206*d* for synthesizing a frequency for use by the mixer circuitry 206*a* of the receive signal path and the transmit signal path. In some aspects, the mixer circuitry 206*a* of the receive signal path can be configured to down-convert RF signals received from the FEM circuitry 208 based on the synthesized frequency provided by synthesizer circuitry 206*d*. The amplifier circuitry 206*b* can be configured to amplify the down-converted signals and the filter circuitry 206*c* can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206*a* of the receive signal path can comprise passive mixers, although the scope of the aspects is not limited in this respect.

In some aspects, the mixer circuitry 206*a* of the transmit signal path can be configured to up-convert input baseband signals based on the synthesized frequency provided by the synthesizer circuitry 206*d* to generate RF output signals for the FEM circuitry 208. The baseband signals can be provided by the baseband circuitry 204 and can be filtered by filter circuitry 206*c*.

In some aspects, the mixer circuitry 206*a* of the receive signal path and the mixer circuitry 206*a* of the transmit signal path can include two or more mixers and can be arranged for quadrature downconversion and upconversion, respectively. In some aspects, the mixer circuitry 206*a* of the receive signal path and the mixer circuitry 206*a* of the transmit signal path can include two or more mixers and can be arranged for image rejection (e.g., Hartley image rejection). In some aspects, the mixer circuitry 206*a* of the receive signal path and the mixer circuitry 206*a* can be arranged for direct downconversion and direct upconversion, respectively. In some aspects, the mixer circuitry 206*a* of the receive signal path and the mixer circuitry 206*a* of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206*d* can be a fractional-N synthesizer or a fractional N/N+1 synthesizer, although the scope of the aspects is not limited in this respect as other types of frequency synthesizers can be suitable. For example, synthesizer circuitry 206*d* can be a delta-sigma synthesizer, a frequency multiplier, or a synthesizer comprising a phase-locked loop with a frequency divider.

The synthesizer circuitry 206*d* can be configured to synthesize an output frequency for use by the mixer circuitry 206*a* of the RF circuitry 206 based on a frequency input and a divider control input. In some aspects, the synthesizer circuitry 206*d* can be a fractional N/N+1 synthesizer.

In some aspects, frequency input can be provided by a voltage controlled oscillator (VCO), although that is not a requirement. Divider control input can be provided by either the baseband circuitry 204 or the application circuitry 202 depending on the desired output frequency. In some aspects, a divider control input (e.g., N) can be determined from a look-up table based on a channel indicated by the application circuitry 202.

Synthesizer circuitry 206*d* of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206*d* can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM circuitry 208, or in both the RF circuitry 206 and the FEM circuitry 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 can be additionally or alternatively coupled with, and perform similar power management operations for, other components such as, but not limited to, application circuitry 202, RF circuitry 206, or FEM circuitry 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC Idle state, where it disconnects from the network and does not perform operations such as channel quality feedback, handover, etc. The device 200 goes into a very low power state and it performs paging where again it periodically wakes up to listen to the network and then powers down again. The device 200 cannot receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3 (L3), Layer 2 (L2), or Layer 1 (L1) functionality, while processors of the application circuitry 202 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node.

Figure 3:
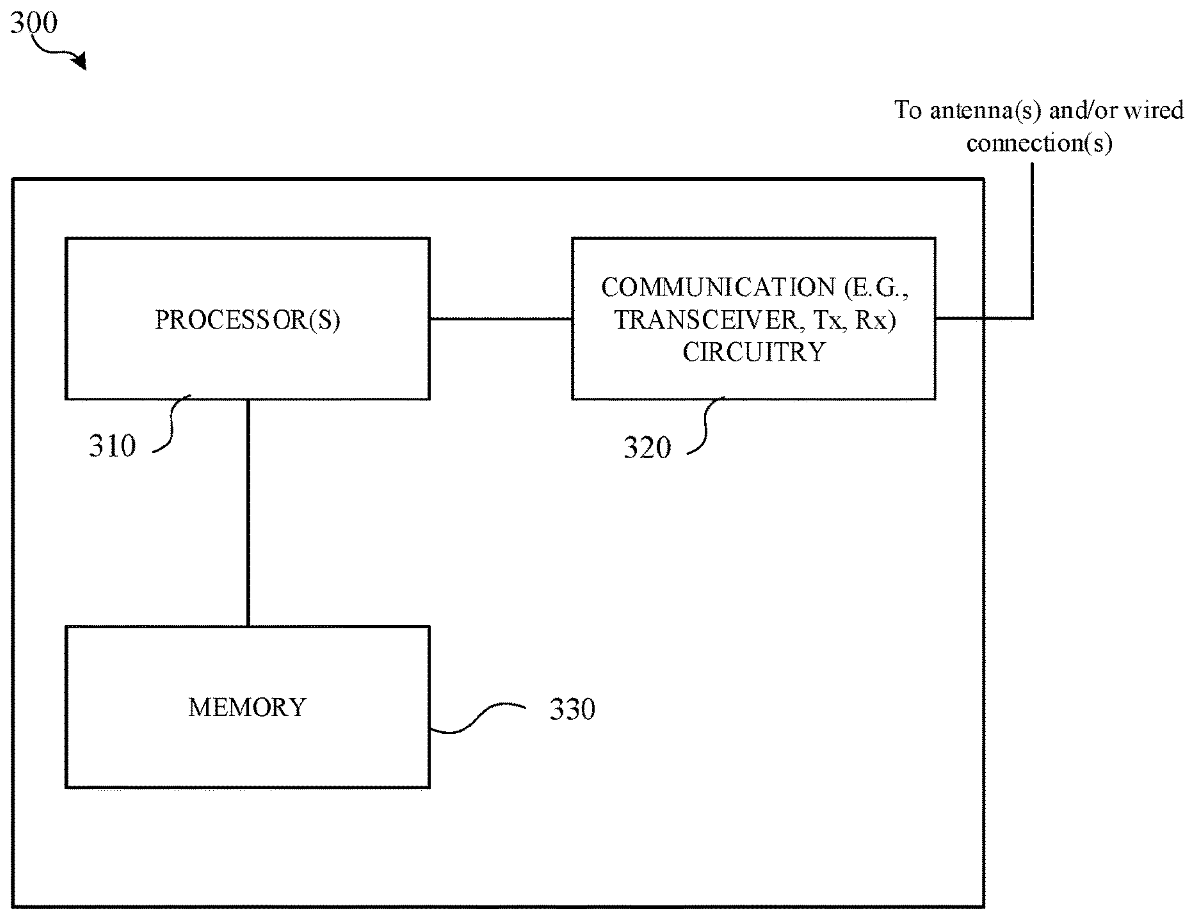
FIG. 3 illustrates an exemplary a simplified block diagram of a user equipment (UE) wireless communication device or other network device/component (e.g., eNB, gNB) in accordance with various aspects.

Referring to FIG. 3, illustrated is a block diagram of a user equipment (UE) device or other network device/component (e.g., gNB, eNB, or other participating network entity/component). The device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

Memory 330 (as well as other memory components discussed herein, e.g., memory, data storage, or the like) can comprise one or more machine-readable medium/media including instructions that, when performed by a machine or component herein cause the machine or other device to perform acts of a method, an apparatus or system for communication using multiple communication technologies according to aspects, embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium.

In an aspect, the UE/gNB device 300 can operate to configure by processing/generating/encoding/decoding a physical layer transmission comprising multiple different transport blocks (TBs) based on an unequal protection between the different TBs in a physical layer encapsulation (e.g., EPC packets, a transmission opportunity, MOOT, a single transmission burst, a TTI or other encapsulation protocol or related encapsulation parameter(s) for the encapsulation of data from higher layers into frames for transmission over the air. The physical layer transmission can be received, transmitter, or provide(d) with communication/transmitter circuitry 320 to similarly process/generate the physical layer transmission with four or less spatial layers via a physical channel in an NR network.

Processor(s) 310 can be components of application circuitry or processor(s) of the baseband circuitry that can be used to execute components or elements of one or more instances of a protocol stack. For example, processor(s) 310 of baseband circuitry, alone or in combination, can be configured to perform various aspects or embodiments for autonomous TCI state updating or beam reporting based TCI indication. An autonomous TCI state update or beam report based TCI indication can refer to the UE 101, for example, reporting the beam report with a TCI state update or beam change without being first signaled by a TCI indication or TCI identifier that signals/triggers/indicates switching TCI states for a TCI state update. Rather, the UE 101 configures the TCI update autonomously and provides the beam report to indicate the TCI state update or beam to the gNB 111. In order to minimize or prevent beam mismatching, in situations where the UE 101 updates the TCI state or beam and the gNB 111 remains operating on different/older one, the UE 101 can receive an ACK or NACK from the gNB 111 before afterwards activating the TCI state update or beam change.

In an aspect, the processor 310 can generate or process an ACK or NACK of a TCI state update in a DCI based on at least one of: a specific radio network temporary identifier (e.g., ACK-RNTI), a legacy DCI that schedules a PDSCH or PUSCH, a dedicated SS/CORESET, or a MAC CE. The ACK or NACK can be determined either implicitly or explicitly in response to a beam report of a TCI update that is signaled.

Figure 4:
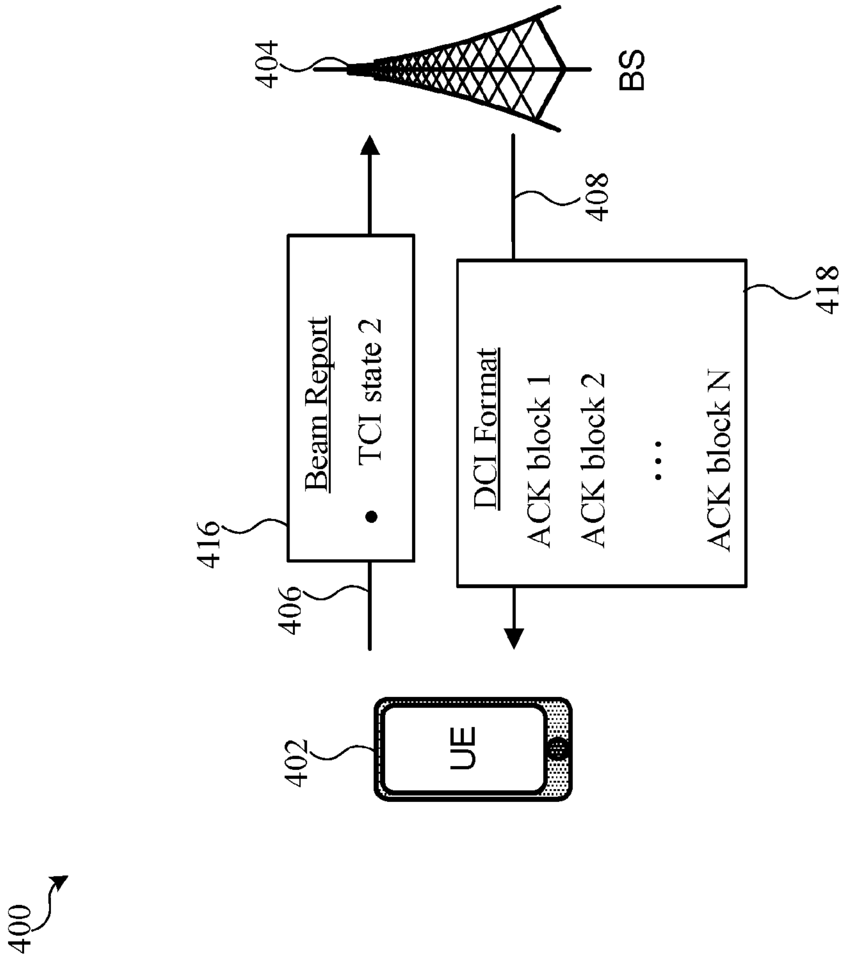
FIG. 4 illustrates example signaling for autonomous TCI state update or beam based TCI indication according to various aspects.

Referring to FIG. 4, illustrated is an example autonomous TCI state update with acknowledgement procedure 400 according to aspects herein. The UE 402 (e.g., 101, 300, or the like) can measure on one or more TCI states corresponding to one or more beams and generate the beam report 416 autonomously without TCI indication/identification/trigger from the base station (BS) or gNB 404 (e.g., gNB 111, 300, or the like) in response to one or more conditions for initiating a beam change or TCI state update. The UE 402 provides the beam report 416 with the TCI state update, as well as a TCI index or corresponding beam quality. The beam report 416 can comprise one or more TCI states as well as corresponding TCI indexes and beam qualities (e.g., RSRP, SINR, etc.).

The UE 402 can provide the beam report with a TCI state update via communication 406, which can be PUSCH, PUCCH, an uplink control information (UCI) multiplexed with PUSCH, a MAC CE, or other communication to the base station 404. In response to the BS 404 receiving and decoding the beam report, the BS or gNB 404 communicates an ACK in DCI 418 to the UE 101 via a downlink physical channel (e.g., PDCCH) 408 or other communication. The BS 404 can provide the ACK in the DCI 418 in a group based manner as a set of ACK blocks allocated to different UEs in a DCI format. The UE 402 can then identify which ACK or NACK applies to the beam report 416. In response to identify the ACK associated with the beam report the UE 402 can then activate the TCI state for transmission on the corresponding beam.

In an aspect, the BS 404 can provide a DCI based on a new radio RNTI (e.g., ACK-RNTI) where the value of this RNTI can be predefined or configured by RRC signaling. In response to receiving the DCI, the UE can then identify an ACK/NACK with the predefined or RRC signaled ACK-RNTI.

In another aspect, the UE 402 can initiate monitoring of the DCI for the ACK or the NACK after an action delay of X symbols/slots after the UE 402 sends the beam report 416. The beam report 416 can be used for the TCI update that the gNB 404 and UE 402 activate/update to for the same TCI state or beam. The action delay X can be predefined, reported by the UE or configured by gNB 404 for autonomous TCI update.

In another aspect, the DCI cell format 418 can be communicated in unicast manner to the UE 402 providing the report with a specific ACK in response to the gNB 404 receiving the beam report. If no ACK is received or identified by the UE 402, the UE 402 can retransmit the beam report.

Alternatively, or additionally, the gNB 404 can provide the DCI format 418 in a group based manner so that multiple UEs including UE 402 share the DCI format 418 comprising multiple ACKs/NACKs. The DCI format 418 message can comprise an ACK index in the DCI for each UE that can each be configured by gNB, an RRC or a higher layer signaling. In one example, the DCI format 418 could be multiple ACK/NACK blocks. For example, the DCI or DCI format 418 can have different fields or resource block or indicators with ACK indices associated with each UE (e.g., ACK block 1, ACK block 2 . . . ACK block N, where in is an integer greater than zero and be any number of UEs active on a serving cell of the gNB 404 that are configured for autonomous TCI state updating.

In another aspect, the DCI 418 can be transmitted in the serving cell with the beam report or another serving cell based on a serving cell index. The serving cell index can be configured by higher layer signaling or RRC signaling. As such, the TCI state update or beam based TCI indication can be configured for cross-cell ACK/NACK transmission. For example, the DCI 418 can be transmitted by another serving cell (e.g., another PCell, PSCell, or other network cell) to the UE 402 for acknowledging the beam report. Based on the serving cell index provided to the UE 402, the UE 402 can determine which serving cell to monitor and decode the associated ACK/NACK from the other serving cell, subsequently activating the TCI state update indicated by the beam report with the other serving cell.

Figure 5:
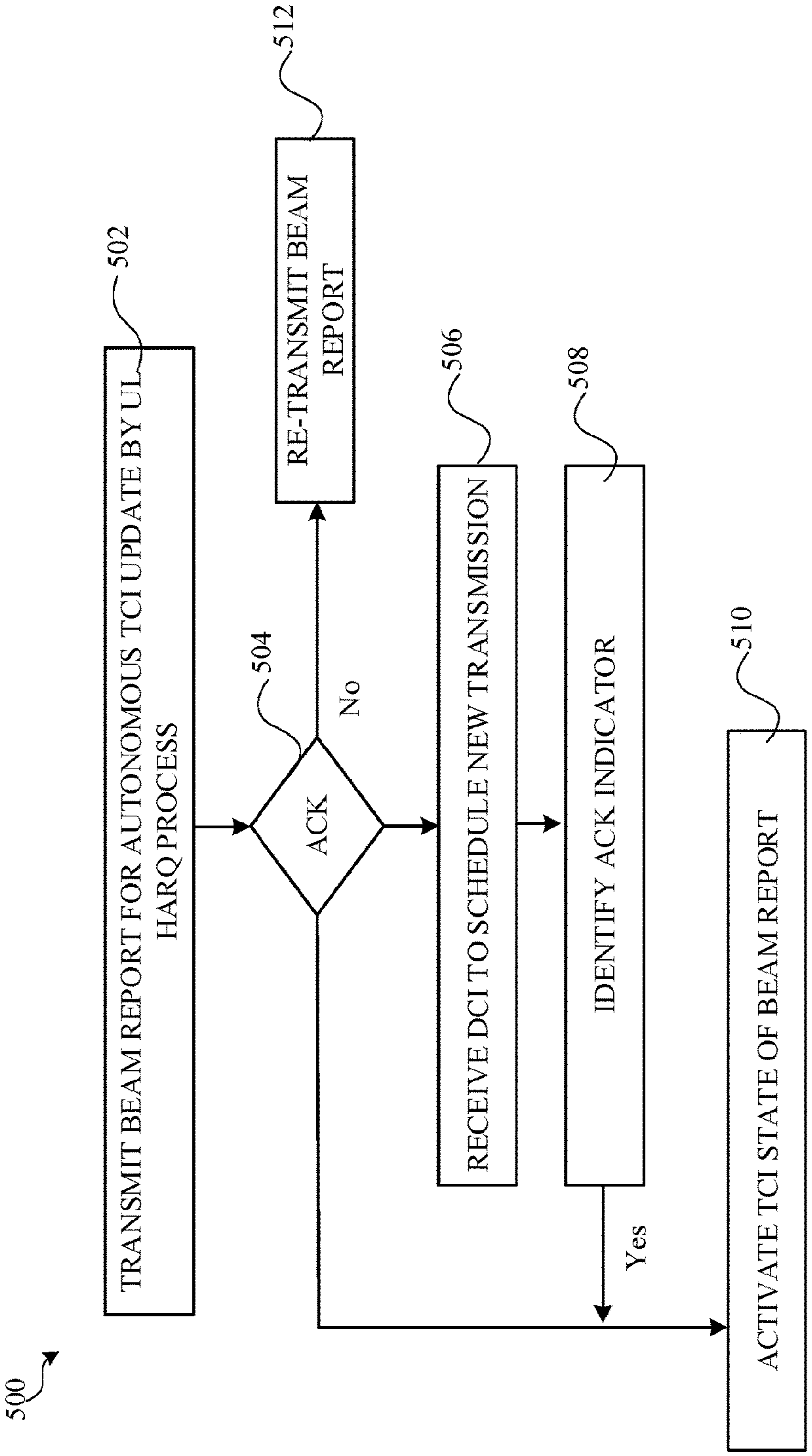
FIG. 5 illustrates an example process flow for autonomous TCI state update or beam based TCI indication according to various aspects.

Referring to FIG. 5, illustrated is an example process flow 500 for an autonomous TCI state update or beam report based TCI indication with ACK/NACK signaling according to aspects herein. The process flow 500 can initiate at 502 with the UE 101 transmitting the beam report to indicate the autonomous TCI state update. The UE 101 can transmit the beam report according to an uplink hybrid automatic repeat request (UL HARQ) process allocated for autonomous TCI update. A UL HARQ process index can be predefined or configured by a higher layer signaling. The UE 101 can have this UL HARQ process identified by the UL HARQ process index that operates as an identifier or ID for the resources to be utilized for transmission. Thus, the gNB 111 can know which HARQ process it receives and is associated with autonomous TCI updating for receiving a beam report from the UE 101.

The process flow 500 further comprises at decision 504 determining whether an ACK is being received and identified in response to transmission of the beam report. If no indication is received or decoded, then NACK can be identified. Additionally, or alternatively, a NACK could be indicated explicitly by a DCI. For example, a new field or bit field (1-bit field, or other number of bits) can be introduced such that the value corresponds to an ACK or a NACK. If a NACK is determined and no ACK is identified, explicitly or implicitly by the signaling behavior of the gNB 111, then the UE 101 can re-transmit the beam report at 512.

The DCI providing the ACK or NACK can be a legacy DCI that schedules a PDSCH or PUSCH, for example. The DCI can indicate whether the latest beam report for autonomous TCI update transmitted X symbols/slots before the DCI is detected correctly or not. X can be predefined or configured by RRC signaling or reported by a UE capability to the gNB 111 by the UE 101, for example, wherein X can be an integer greater than zero.

As a part of the ACK decision process 504, the UE 101 at 506 can determine whether the received DCI schedules a new transmission. For example, a new data indicator field or other indication can be toggled, for a corresponding HARQ process (e.g., the UL HARQ process). In this case, the UE 101 can identify that there is an ACK indication at 508 based on the scheduling of a new transmission. In response to identify or decoding an ACK, either by explicit indication or implicitly by the gNB's request for new transmission, the UE 101 can operate by activating the TCI state of the beam report at 510. Additionally, or alternatively, if a retransmission is scheduled, then the UE 101 can determine implicitly that a NACK is indicated and operate to retransmit the beam report as at 512.

Figure 6:
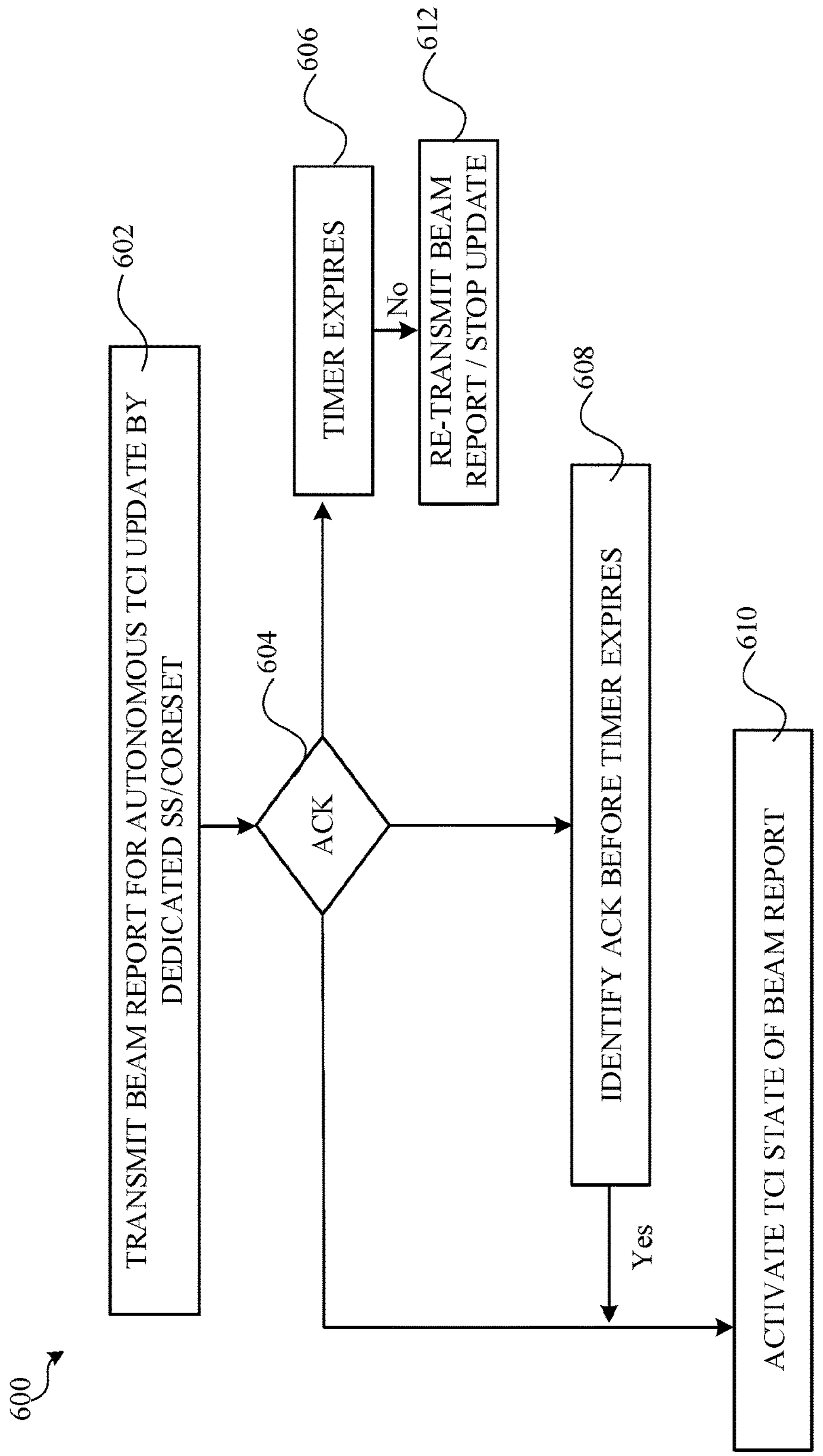
FIG. 6 illustrates another example process flow for autonomous TCI state update or beam based TCI indication according to various aspects.

Referring to FIG. 6, illustrated is another example process flow 600 for an autonomous TCI state update or beam report based TCI indication with ACK/NACK signaling according to aspects herein. The process flow 600 can initiate at 602 with transmitting the beam report for autonomous TCI update by a dedicated search space (SS) or dedicated control resource set (CORESET).

In an aspect, the acknowledgement by the gNB 111 can be transmitted by a PDCCH in a dedicated SS or dedicated CORESET. The dedicated SS/CORESET can be configured by the gNB 111 or a higher layer signaling (e.g., by RRC signaling), or be predefined. The dedicated SS/CORESET can be configured per bandwidth part (BWP) or per component carrier (CC) or per band. For example, the SS/CORESET for a particular BWP, CC or bandwidth can be associated with the ACK/NACK for autonomous TCI state updating, or beam based TCI indication for the UE 101.

Additionally, or alternatively, the DCI transmitted in the dedicated SS/CORESET can be based on a legacy DCI format or be associated with a particular RNTI (e.g., Cell RNTI (C-RNTI)/Modulation and Coding Scheme (MCS)-C-RNTI). In particular, as a dedicated SS/CORESET, this particular SS/CORESET of the DCI is not used for other PDCCH transmission other than for responding to, acknowledging the ACK or a NACK for autonomous TCI state updating, or beam based TCI indication so as to prevent beam mismatching. As such, the DCI on a particular BWP, CC or band with at the particular SS or CORESET can be designated as a dedicated SS/CORESET for beam report acknowledgement or non-acknowledgement.

At 604, the UE 101 monitors for an ACK and determines whether an ACK or NACK is present. According to aspects, the UE 101 can start monitoring the DCI after X symbols/slots, after the UE 101 sends the beam report for autonomous TCI update. As such, an action delay X can be configured as a part of determining the ACK/NACK for beam reporting in autonomous TCI state updating. X can be an integer greater than zero and the value can be predefined, configured by gNB or RRC signaling, or reported by UE capability so it is a known parameter.

Additionally, or alternatively, an ACK/NACK timer for the autonomous TCI state update can be configured specifically for monitoring of the SS/CORESET monitoring provided by the gNB 111 as discussed above. The timer can initiate when the UE 101 starts to monitor the DCI in the SS/CORESET. For example, at X symbols/slots after sending the beam report. In response to decoding the DCI correctly in the SS/CORESET at 608, the timer can be reset. This means the UE detects the ACK, and the UE 101 activates the TCI state of the beam report accordingly at 610. However, if the timer expires as at 606, the UE 101 can determine that the beam report was not received or decoded property by the gNB 111. This means the UE 101 determines a NACK, and stops monitoring for the SS/CORESET. The UE 101 can then re-transmit the beam report for the TCI state update or remain in the current state as at 612.

In an aspect, the duration of the timer can be configured by higher layer signaling (e.g., RRC), or predefined.

Additionally, or alternatively, the PDCCH in the dedicated SS/CORESET can be transmitted by the old beam or based on this new beam selected from the beam report or reported by the UE. This can also be an indication of whether an ACK/NACK is implied or not, but not necessarily. If transmitted on the old beam, a NACK could be determined, but other aspects or factors as discussed herein can be combined or utilized to determine the ACK/NACK. Likewise, if transmitted on the new beam an ACK could be implicitly determined as well, or weigh in favor of an ACK along with other aspects as well.

Figure 7:
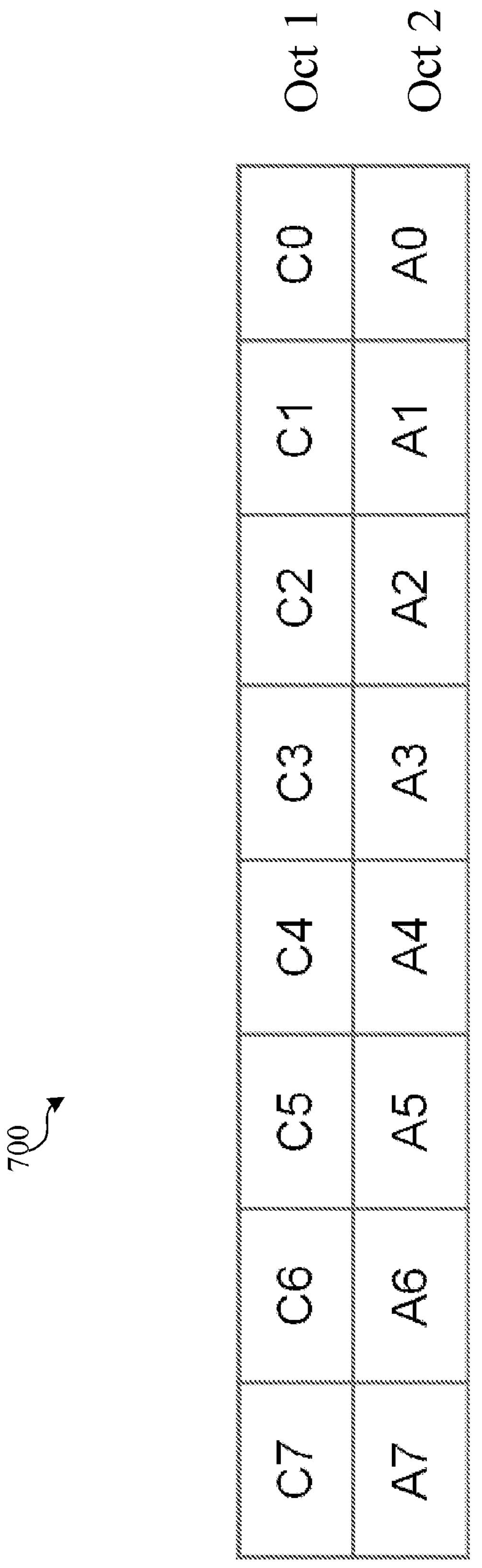
FIG. 7 illustrates an example ACK/NACK configuration for autonomous TCI state update or beam based TCI indication according to various aspects.

Referring to FIG. 7, illustrated is an example ACK/NACK signaling 700 according to aspects herein for an autonomous TCI state update or beam report based TCI indication. In an aspect, the ACK/NACK can be transmitted from the gNB 111 via a medium access control (MAC) control element (MAC CE). The MAC CE can indicate whether the latest beam report for autonomous TCI update transmitted X symbols/slots before the DCI is detected correctly or not. X may be predefined or configured by RRC signaling or reported by UE capability, and be an integer greater than zero, for example.

Additionally, or alternatively, the MAC CE can indicate whether the gNB 111 receives the decoding status of the beam report or not for each serving cell. For example, the MAC CE format can comprise serving cell indices and an associated ACK/NACK status for beam report based TCI indication or autonomous TCI state updating. The MAC CE, for example, can be represented as follows: Cj indicates the serving cell j; Aj indicates the ACK/NACK status for beam report in serving cell j. As such C7, for example, can be associated with a serving cell C at index 7 to the ACK/NACK A of index 7. Each field can be a date field or a bit field with one or more datum or one or more indications such as bit indication(s), for example. Although an octagonal or 8 sets of blocks are demonstrated in such signaling as a bitmap or data set corresponding to the ACK/NACKs of multiple serving cells, any number of other blocks can be configured according to a number of serving cells associated with beam reporting based TCI indication/autonomous TCI state updating. This can depend on a number of serving cells active with the UE 101, for example.

Figure 8:
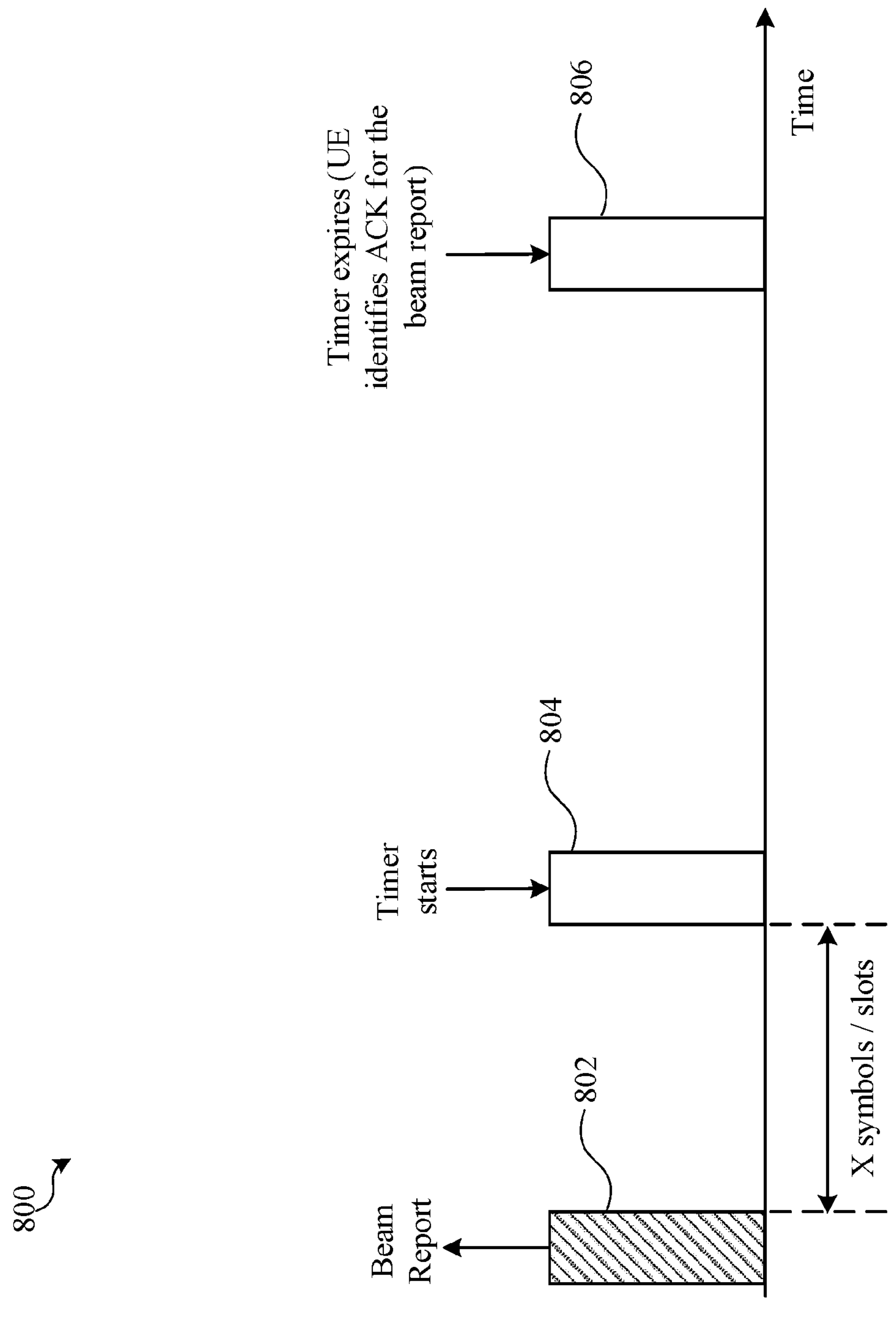
FIG. 8 illustrates an example ACK/NACK signaling for autonomous TCI state update or beam based TCI indication according to various aspects.

Referring to FIG. 8, illustrated is another example ACK/NACK signaling 800 according to aspects herein for an autonomous TCI state update or beam report based TCI indication. The acknowledgement signaling can be determined based on a timer based on ACK/NACK report mechanism configured at the UE 101. The UE 101 can trigger an autonomous TCI state update by providing the beam report at a symbol/slot 802. The timer starts after X symbols/slots after the last symbol of the beam report transmission at 804. X can be predefined or configured by RRC signaling or reported by UE capability. Additionally, a duration of the timer can also be configured by gNB 111, a higher layer signaling, RRC signaling, or be predefined. Similar to aspects herein, the timer can begin after the beam(s) are reported at 804. The timer can be reset if the UE 101 receives a PDCCH to trigger beam report. For example, if the UE 101 receives an indication signaled to trigger an aperiodic beam report or a retransmission before the timer expires at 806. If the timer expires at expiration 806, the UE 101 can assume or implicitly identify that the beam report is decoded by the gNB 111 correctly, and proceed with activating the TCI state with the beam as indicated in the provided beam report.

Figure 9:
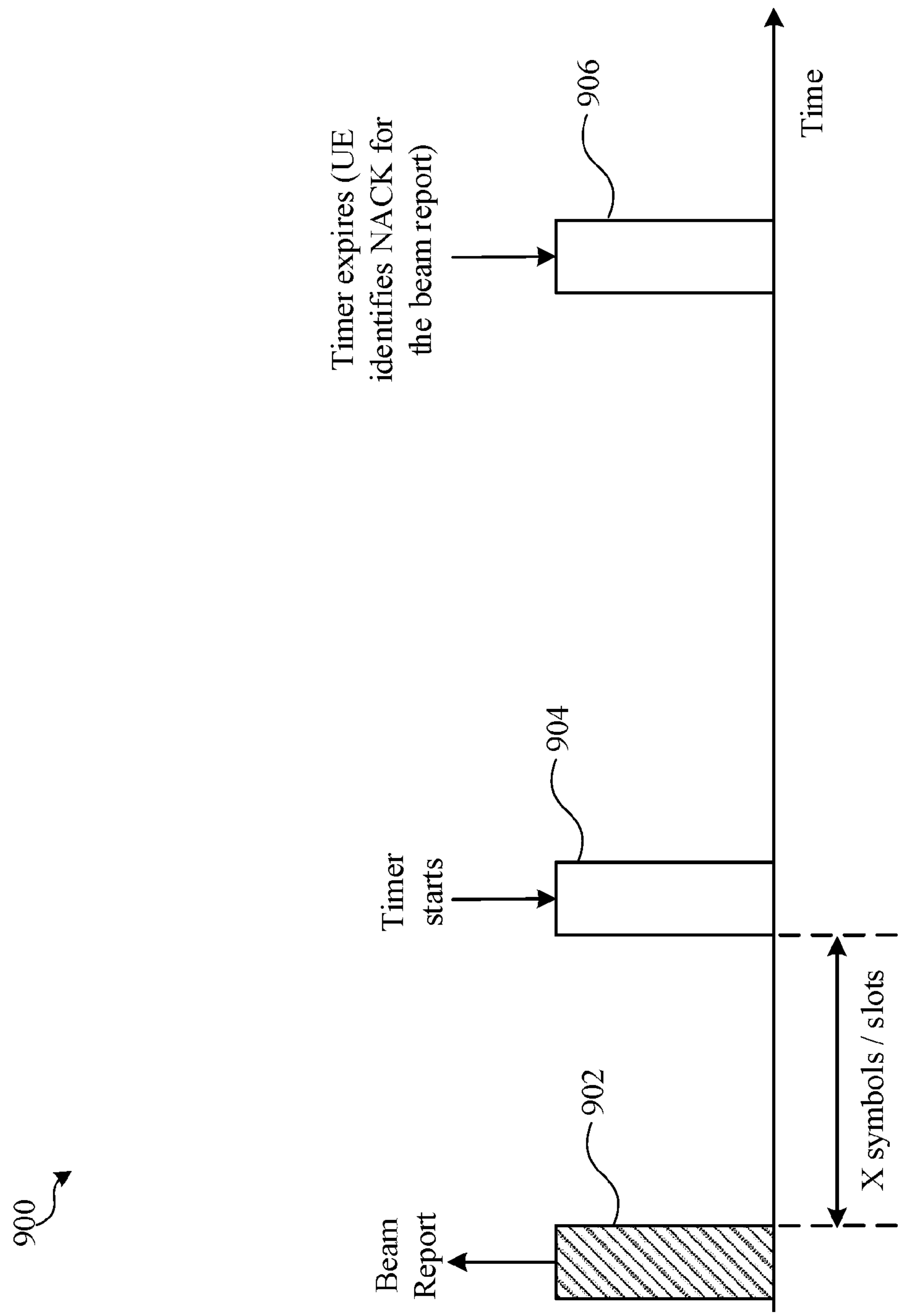
FIG. 9 illustrates an example ACK/NACK signaling for autonomous TCI state update or beam based TCI indication according to various aspects.

Referring to FIG. 9, illustrated is another example ACK/NACK signaling 900 according to aspects herein for an autonomous TCI state update or beam report based TCI indication. Similar to FIG. 8, at FIG. 9 the UE 101 provides a beam report at 902. After X symbols/slots the UE 101 initiates a timer based ACK/NACK mechanism. However, at expiration 906 the UE 101 assumes or implicitly determines that the beam report is not decoded by the gNB 111 correctly, and either stops the autonomous TCI update or re-transmits the beam report. The timer can be reset if the UE 101 receives a trigger for a beam report or if an ACK is identified/detected according to any one or more of aspects described herein this disclosure. For example, the gNB could provide a PDCCH for an aperiodic beam report, or other signal, physical channel, or beam report type other than aperiodic.

In another aspect, the UE 101 can transmit a beam report by a UCI/PUCCH, or via a MAC CE. As such, a current ACK/NACK associated with MAC CE signaling can be utilized to provide the ACK/NACK corresponding to beam report based TCI indication or an autonomous TCI state update initiated by the UE 101, for example. The beam report can be transmitted in different manners, in periodic/semi-persistent/aperiodic manner, for example.

In a CSI report configuration (e.g., a CSI-reportConfig), or an information element associated with the CSI reporting configuration and associated resource parameters, the gNB 111 can provide an ACK/NACK signaling indicator, for example, to indicate whether the beam report is transmitted based on a MAC CE, or a legacy approach via other signaling aspects herein such as by UCI or PUCCH. For example, if this indicator is disabled for the MAC CE based report, the UE 101 for beam based reporting in autonomous TCI state update can still use the UCI or PUCCH for this beam report. This means beam based TCI indication can be activated for legacy signaling or via a MAC CE.

If the UE 101 receives a DCI that schedules a new transmission (e.g., a toggled new data indicator (NDI)), for a same HARQ process as the beam report, the UE 101 can assume that the beam report is decoded successfully. Otherwise, the UE 101 can assume that the beam report is not decoded successfully, as a NACK.

Additionally, or alternatively, if the beam report contains more than one beam or associated TCI state, the acknowledgement could be transmitted based on the beam with a highest reported beam quality (e.g., L1-RSRP or L1-SINR). The acknowledgement can be transmitted based on the old TCI/beam or transmitted by the new beam based on the beam report.

Figure 10:
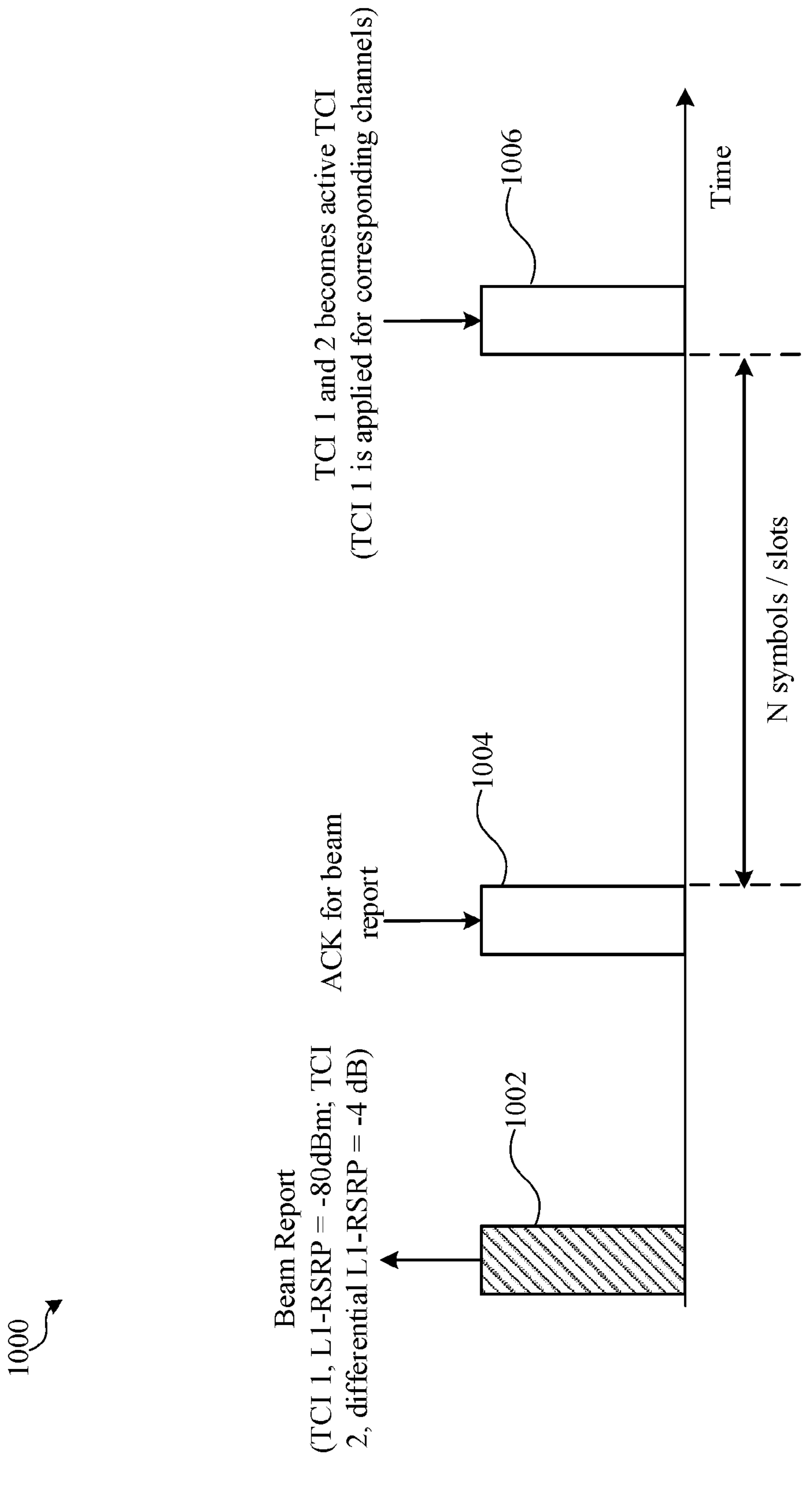
FIG. 10 illustrates an example ACK/NACK signaling for autonomous TCI state update or beam based TCI indication according to various aspects.

Referring to FIG. 10, illustrated is an example of autonomous TCI state update or beam report based TCI indication in accord with various aspects associated with action delay and UE behavior. For example, the UE 101 can provide a beam report with more than one TCI state along with other indications. The beam report can include a TCI index along with a beam quality associated with the different TCI states at 1002. For example, the beam report can include TCI 1 associated with an L1-RSRP (e.g., −80 dBm). Another TCI state, TCI 2 can include a differential associated with the other TCI state beam quality (e.g., −4 dB). After an action delay N symbols/slots after UE 101 receives the ACK of the beam report at 1004 for autonomous TCI update at 1004, the UE 101 can update the active TCI states associated with the beam report at 1006. This action delay N can be predefined or configured by gNB 111, RRC signaling or be reported by UE capability.

In an aspect, the beam report can be measured based on a plurality of configured TCI states. The gNB 111 can configure these TCI states for beam measurement and then report these TCI states in the beam report. The UE 101 can configure the beam report with associated TCI indices as well as associated beam qualities when initiating the autonomous TCI state update by providing the beam report. In response to two or more different reference signals (RS)s in the TCI state or associated with a TCI state, the beam report can be based on the RS providing QCL-TypeD (spatial Rx parameter) indication. The gNB 111 can then configure the TCI state that is QCLed with an RS from among the RSs to switch to the appropriate beam or TCI state as the UE 101.

In an aspect, when there are two RSs in the TCI state, the UE 101 can provide a two QCL type indication, one for QCL type A and the other for QCL type D, for example. Type D is for spatial parameter indication for beam indication.

Additionally, or alternatively, the UE 101 can report multiple (M) TCI State index in the beam report, and the M TCI states can be considered as active TCI states. Each TCI state from among these M TCI states can include one TCI state of index m that is applied as the new beam. The index m can be predefined as the one with highest beam quality, the first one from a priority of TCI states, configured by the gNB 111, indicated by a higher layer signaling (e.g., via RRC or MAC CE), or indicated by a DCI format (e.g., DCI format 1_1/1_2).

In the example of FIG. 10, the UE 101 can report a plurality of beams in the beam report (e.g., TCI 1 and TCI 2) as well as the corresponding layer 1 (L1) RSRP. Afterwards, the UE 101 receives the ACK for this beam port at 1006. Then TCI state 1 and TCI state 2 become active TCI states. TCI 1 state, for example, can become applied as the new TCI state for the corresponding channels because TCI 1 provides a better L1-RSRP. The gNB 101 can reserve the ability to control a change to a different state based on a TCI update or other TCI update signaling. However, without any further TCI update signaling, the gNB 111 could apply TCI state 1 based on additional information provided in the beam report with TCI state(s) for beam reported based TCI update indication.

Figure 11:
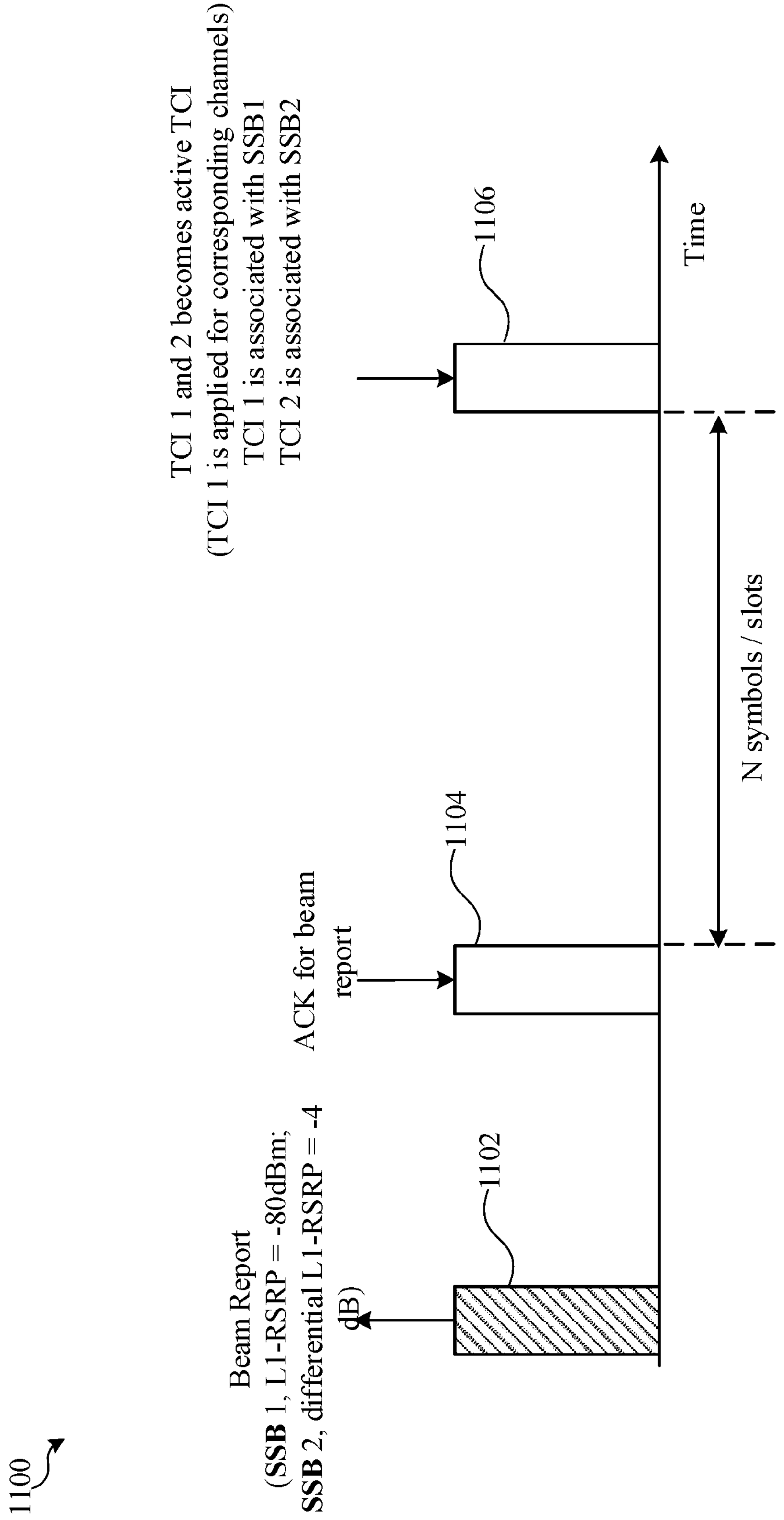
FIG. 11 illustrates an example ACK/NACK signaling for autonomous TCI state update or beam based TCI indication according to various aspects.

Referring to FIG. 11, illustrated is another example of autonomous TCI state update or beam report based TCI indication in accord with various aspects associated with action delay and UE behavior. Similar as FIG. 10, the UE 101 can provide a beam report with more than one TCI state along with other indications. The beam report can include a TCI index along with a beam quality associated with the different TCI states at 1102. For example, the beam report can include TCI 1 associated with an L1-RSRP (e.g., −80 dBm). Another TCI state, TCI 2 can include a differential associated with the other TCI state beam quality (e.g., −4 dB). After an action delay N symbols/slots after UE 101 receives the ACK of the beam report at 1004 for autonomous TCI update at 1104, the UE 101 can update the active TCI states associated with the beam report at 1106. This action delay N can be predefined or configured by gNB 111, RRC signaling or be reported by UE capability.

In an aspect, the beam report for autonomous TCI update can be measured based on at least one of: an SSB or CSI-RS. The UE 101 can consider SSB or CSI-RS resource(s) for configuring the beam report. The UE 101 can further report the SSB resource index (SSBRI) or CSI-RS resource index (CRI) as well as corresponding beam quality (e.g., L1-RSRP/L1-SINR) in the beam report for autonomous TCI state update.

Associations between the TCI and SSB/CSI-RS can be configured to determine with the beam report which TCI state to activate/use at the UE 101. In one aspect, a TCI to SSB/CSI-RS association can be configured by the gNB 111 or based on higher layer signaling. Additionally, or alternatively, the TCI to SSB/CSI-RS association can be determined by the quasi-co-location (QCL) configuration, as an implicit manner of association. If the source reference signal in the TCI and the SSB/CSI-RS share the same QCL source, or the source reference signal (RS) in the TCI is the same as the SSB/CSI-RS, the TCI and the SSB/CSI-RS can be considered as associated.

In this example, UE 101 has reported the quality for SSB 1 or SSB 2 at 1102 and after receiving the ACK at 1104, the UE 101 applies the TCI state 1 and TCI state 2 to be the active TCI state because TCI 1 is associated with SSB 1 and TCI 2 is associated with SSB 2. TCI can be applied for corresponding channels per the better quality, for example. CSI-RS can also be reported and considered similarly as a part of the beam report and TCI state updating.

Additionally, or alternatively, the gNB 111 or UE 101 can further configure whether the beam report is for a downlink TCI update, an uplink TCI update or for both UL and DL TCI update. For example, the UE 101 could update DL/UL TCI state for an DL/UL channel correspondingly after receiving the acknowledgement for the beam report at 1104. In other words, the UE 101 could update DL/UL TCI state for the corresponding DL/UL channel after receiving/identifying an acknowledgement for the provided beam report. This updated to the DL/UL TCI state depend on whether the measurement reference signal is based on DL TCI State or UL TCI state or a joint UL/DL TCI State.

Additionally, or alternatively, a separate field can be introduced in CSI-reportConfig to indicate whether the UE 101 should apply a reported beam report for the UL or for the DL TCI state to indicate the type of target TCI update for the beam report for autonomous TCI update.

Additionally, or alternatively, in the beam report for autonomous TCI update, the UE 101 can indicate whether the TCI state update is for UL or DL or both UL/DL TCI update. The difference between the two aspects is in the first it is controlled by gNB for UL/DL or both, and second is by the UE 101 so UE can signal whether the report is for UL/DL/both. This can be indicated per reported beam or per report instance, for example. In one example, for each beam in the beam report, a 2-bit indicator can be provided to indicate whether the TCI state update is applicable for UL or DL or both UL/DL. In another example, the gNB 111 can indicate whether this is for separate TCI indication or a joint TCI indication. If the beam reporting is for separate TCI indication, a 1-bit indicator can be introduced for each beam to report whether the beam is for UL or DL. If this is for joint TCI indication, no additional indicator is necessarily needed, and a legacy beam format can be utilized as discussed herein.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment, aspect or example provided within this disclosure and can be applied to any of the systems/devices/components disclosed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is a user equipment (UE), comprising: a memory; and processing circuitry configured to: transmit a beam report to indicate an autonomous transmission configuration indicator (TCI) state update from a first TCI state to a second TCI state; determine an acknowledgement (ACK) or a non-acknowledgement (NACK) indicating whether the beam report is decoded; and activate the second TCI state of the autonomous TCI state update based on the ACK or re-transmit the beam report based on the NACK.

A second example can include the first example, wherein the processing circuitry is further configured to: receive a downlink control information (DCI) via a physical downlink control channel (PDCCH) based on an ACK radio network temporary identifier (ACK-RNTI) that indicates the ACK or the NACK corresponding to a decoding status of the beam report.

A third example can include the first or second example, wherein the processing circuitry is further configured to: monitor a DCI based on an X number of symbols/slots after transmission of the beam report to identify the ACK or the NACK, wherein X is an integer greater than zero that is predefined, configured by a radio resource control (RRC) signaling, or reported by a UE capability.

A fourth example can include any one or more of the first through third examples, wherein the processing circuitry is further configured to: receive the DCI from a serving cell that is provided with the beam report; or receive the DCI from another serving cell other than the serving cell that is provided with the beam report and an associated serving cell index to enable monitoring of the DCI from the another serving cell.

A fifth example can include any one or more of the first through fourth examples, wherein the DCI is received via a unicast transmission or a group-based transmission, and in response to receiving the DCI via the group-based transmission, the processing circuitry is further configured to determine the ACK or the NACK associated with the beam report based on an ACK index from among resource blocks shared among different UEs.

A sixth example can include any one or more of the first through fifth examples, wherein the DCI is configured to schedule a physical downlink shared channel (PDSCH) or a physical uplink shared channel (PUSCH) and indicates whether the beam report is decoded correctly, wherein the processing circuitry is further configured to determine whether the beam report is decoded correctly by a base station based on a bit field of the DCI or based on a scheduling of a new transmission/re-transmission by the DCI.

A seventh example can include any one or more of the first through sixth examples, wherein the processing circuitry is further configured to: determine the ACK or the NACK via a dedicated search space (SS) or a dedicated control resource set (CORESET) of a PDCCH, wherein the dedicated SS or the dedicated CORESET is configured per bandwidth part (BWP), per component carrier (CC) or per frequency band.

An eighth example can include any one or more of the first through seventh examples, wherein the processing circuitry is further configured to: monitor the dedicated SS or the dedicated CORESET based on a number of symbols/slots after transmission of the beam report to identify the ACK or the NACK and based on a timer duration that initiates at monitoring of the dedicated SS or the dedicated CORESET; and determine the NACK in response to the timer duration expiring before detecting the ACK by decoding the DCI.

A ninth example can include any one or more of the first through eighth examples, wherein the processing circuitry is further configured to: receive a medium access control (MAC)control element (MAC CE) that indicates the ACK or the NACK corresponding to a decoding status of the beam report for a plurality of serving cells based on an X number of symbols/slots after transmission of the beam report, wherein X is an integer greater than zero that is predefined, configured by an RRC signaling, or reported by a UE capability.

A tenth example can include any one or more of the first through ninth examples, wherein the processing circuitry is further configured to: monitor a timer duration of a timer that initiates an X number of symbols/slots after transmission of the beam report to identify the ACK or the NACK, wherein X is an integer greater than zero that is predefined, configured by a RRC signaling, or reported by a UE capability; resetting the timer in response to receiving a PDCCH to trigger the beam report or an aperiodic beam report; and in response to an expiration of the timer duration, determining that the beam report is not acknowledged as the NACK or determining that the beam report is acknowledged as the ACK.

An eleventh example can include any one or more of the first through tenth examples, wherein the processing circuitry is further configured to: transmit the beam report to indicate the autonomous TCI state update via a MAC CE by at least one of: a periodic transmission, a semi-persistent transmission or an aperiodic transmission; and in response to receiving a DCI scheduling a new transmission for a same HARQ process corresponding to the beam report, determine that the beam report is acknowledged as the ACK.

A twelfth example can include any one or more of the first through eleventh examples, wherein the processing circuitry is further configured to: activate the second TCI state of the autonomous TCI state update based on the ACK based on an action delay of N symbols/slots for the autonomous TCI update, wherein N is an integer greater than zero that is predefined, configured by an RRC signaling, or reported by a UE capability.

A thirteenth example can include any one or more of the first through twelfth examples, wherein the processing circuitry is further configured to: in response to more than one reference signal (RS) corresponding to a TCI state, measure and report the beam quality for the TCI state based on the RS that provides a quasi-co-location (QCL)-TypeD indication.

A fourteenth example can include any one or more of the first through thirteenth examples, wherein the processing circuitry is further configured to: configure the beam report according to one or more measurements based on at least one of: a synchronization signal block (SSB) or a channel state information reference signal (CSI-RS), wherein the beam report comprises at least one of: an SSB resource index (SSBRI) or a CSI-RS resource index (CRI), and one or more beam qualities corresponding to the at least one of: the SSBRI or the CRI that is associated with the at least one of: the SSB or the CSI-RS.

A fifteenth example can include any one or more of the first through fourteenth examples, wherein the processing circuitry is further configured to: provide an indication via the beam report whether the beam report is associated with an uplink (UL) TCI update, a downlink (DL) TCI update, or both the UL TCI update and the DL TCI update per reported beam or per report instance of the beam report.

A sixteenth example is a base station comprising: a memory, and processing circuitry configured to: receive a beam report based on an autonomous transmission configuration indicator (TCI) state update; and transmit an indication of an acknowledgement (ACK) or a non-acknowledgement (NACK) indicating whether the beam report is decoded successfully.

A seventeenth example can include the sixteenth example, wherein the processing circuitry is further configured to: provide a downlink control information (DCI) based on a radio network temporary identifier (RNTI) specific to indicating the ACK or the NACK based on a decoding status of the beam report, wherein the RNTI is predefined or configured via a radio resource control (RRC) signaling.

An eighteenth example can include any one or more of the sixteenth through seventeenth examples, wherein the processing circuitry is further configured to: provide a DCI indicating the ACK or the NACK in response to receiving the beam report via a unicast transmission or a group-based transmission for a plurality of UEs via a serving cell associated with the beam report or another serving cell, and configuring a serving cell index corresponding to a UE of the plurality of UEs based on a higher layer signaling or an RRC signaling.

A nineteenth example can include any one or more of the sixteenth through eighteenth examples, wherein the processing circuitry is further configured to: monitor a physical uplink control channel (PUCCH) or a physical uplink shared channel (PUSCH) based on an X number of symbols/slots after transmission of the beam report before providing a DCI to provide the indication of the ACK or the NACK, wherein the DCI is configured to schedule a physical downlink share channel (PDSCH) or the PUSCH, and wherein X is an integer greater than zero that is predefined, configured by a radio resource control (RRC) signaling, or reported by a UE capability.

A twentieth example can include any one or more of the sixteenth through nineteenth examples, wherein the processing circuitry is further configured to: allocating an uplink hybrid automatic repeat request (UL HARQ) process for the autonomous TCI state update with the beam report based on a HARQ process index that is predefined or configured via higher layer signaling; and provide a DCI that schedules a transmission for the UL HARQ process based on the beam report or a retransmission for the UL HARQ process, wherein scheduling the transmission based on an updated TCI of the beam report indicates that the beam report is decoded successfully as the ACK, and the re-transmission indicates that the beam report is not decoded successfully as the NACK.

A twenty-first example can include any one or more of the sixteenth through twentieth examples, wherein the processing circuitry is further configured to: transmit the indication of the ACK or the NACK via a PDCCH in a dedicated search space (SS) or a dedicated control resource set (CORESET) via an old beam or a beam selected from the beam report, wherein the dedicated SS or the dedicated CORESET is configured per bandwidth part (BWP), per component carrier (CC) or per frequency band, wherein a DCI in the dedicated SS or the dedicated CORESET is based on a DCI format or is associated with a cell (C)-RNTI or a modulation and coding scheme (MCS)-C-RNTI.

A twenty-second example can include any one or more of the sixteenth through twenty-first examples, wherein the processing circuitry is further configured to: transmit the indication of the ACK or the NACK via a medium access control (MAC) control element (MAC CE), wherein the MAC CE is configured with a serving cell index corresponding to a status of the ACK or the NACK for the beam report associated with the serving cell index.

A twenty-third example can include any one or more of the sixteenth through twenty-second examples, wherein the processing circuitry is further configured to: receive the beam report via a MAC CE or other type of uplink transmission based on a channel state information report (CSI) report configuration (CSI-reportConfig) that indicates whether the beam report is transmitted via the MAC CE or the other type of the uplink transmission.

A twenty-fourth example can include any one or more of the sixteenth through twenty-third examples, wherein the processing circuitry is further configured to: in response to the beam report being associated with a plurality of beams, providing the ACK with a beam based on a beam quality from among the plurality of beams associated with the beam report, wherein the beam report includes a TCI index and a beam quality associated with the beam of the plurality of beams.

A twenty-fifth example can include any one or more of the sixteenth through twenty-fourth examples, wherein the processing circuitry is further configured to: receive the beam report comprising different reference signals (RSs) that are associated with a TCI state in the autonomous TCI state update; determine an updated beam based on a TCI state index associated with the beam report, and at least one of: a highest beam quality among a plurality of beams, a priority order of the plurality of beams, or an indication of the updated beam from a higher layer signaling; and provide the ACK for the updated beam to be activated.

A twenty-sixth example can include any one or more of the sixteenth through twenty-fifth examples, wherein the processing circuitry is further configured to: provide an indication indicating whether the beam report is to be configured for a downlink TCI update, an uplink TCI update, or both downlink and uplink TCI update to enable a user equipment (UE) to update a TCI state based on the indication.

A twenty-seventh example can be a baseband processor comprising: a memory, and processing circuitry configured to: transmit a beam report to indicate an autonomous transmission configuration indicator (TCI) state update; determine an acknowledgement (ACK) or non-acknowledgement (NACK) indicating whether the beam report is decoded; and activate a TCI state of the autonomous TCI state update based on the ACK or re-transmit the beam report.

A twenty-eighth example can include the twenty-seventh example, wherein the processing circuitry is further configured to: process a downlink control information (DCI) via a physical downlink control channel (PDCCH) based on a radio network temporary identifier (RNTI) specific to indicating the ACK or the NACK based on a decoding status of the beam report, wherein the RNTI is predefined or configured via a radio resource control (RRC) signaling.

A twenty-ninth example can include any one of the twenty-seventh through twenty-eighth examples, wherein the processing circuitry is further configured to: receive a DCI via a unicast transmission or a group-based transmission; and in response to the DCI via the group-based transmission, determine the ACK or the NACK associated with the beam report based on an ACK index of resource blocks corresponding to different UEs.

A thirtieth example can include any one of the twenty-seventh through twenty-ninth examples, wherein the processing circuitry is further configured to: generate the beam report based on a hybrid automatic repeat request (HARQ) process index of an uplink (UL) HARQ for the autonomous TCI state update, wherein the HARQ process index is predefined or configured via higher layer signaling; and receive a DCI that schedules a transmission for the UL HARQ process based on the beam report or that triggers a retransmission for the UL HARQ process, wherein a scheduling of the transmission based on an updated TCI of the beam report indicates that the beam report is decoded successfully as the ACK, and the re-transmission indicates that the beam report is not decoded successfully as the NACK.

A thirty-first example can include any one of the twenty-seventh through thirtieth examples, wherein the processing circuitry is further configured to: determine the ACK or the NACK via a dedicated search space (SS) or a dedicated control resource set (CORESET) of a PDCCH, wherein the dedicated SS or the dedicated CORESET is configured per bandwidth part (BWP), per component carrier (CC) or per frequency band.

A thirty-second example can include any one of the twenty-seventh through thirty-first examples, wherein the processing circuitry is further configured to: transmit the beam report to indicate the autonomous TCI state update via a medium access control (MAC) control element (MAC CE) by at least one of: a periodic transmission, a semi-persistent transmission or an aperiodic transmission; and in response to receiving a DCI scheduling a new transmission for a same HARQ process corresponding to the beam report, determine that the beam report is acknowledged as the ACK.

A thirty-third example can include any one of the twenty-seventh through thirty-second examples, wherein the processing circuitry is further configured to: in response to more than one reference signal (RS) corresponding to a TCI state, measure and report the beam quality for the TCI state based on the RS that provides a quasi-co-location (QCL)-TypeD indication in the beam report.

A thirty-four can include an apparatus comprising means to perform one or more elements of a method described in or related to any of first thru twenty-first examples, or any other method or process described herein.

A thirty-fifth example can include one or more non-transitory computer-readable media comprising instructions to cause an electronic device, upon execution of the instructions by one or more processors of the electronic device, to perform one or more elements of a method described in or related to any one of the first thru twenty-first examples, or any other method or process described herein.

A thirty-sixth example can include an apparatus comprising logic, modules, or circuitry to perform one or more elements of a method described in or related to any one of the first thru twenty-first examples, or any other method or process described herein.

A thirty-seventh example can include a method, technique, or process as described in or related any one of the first thru twenty-first examples, or portions or parts thereof.

A thirty-eighth example can include an apparatus comprising: one or more processors and one or more computer-readable media comprising instructions that, when executed by the one or more processors, cause the one or more processors to perform the method, techniques, or process as described in or related to any one of the first thru twenty-first examples, or portions thereof.

A thirty-ninth example can include a signal as described in or related to any of examples 1-29, or portions or parts thereof.

A fourtieth example can include a datagram, packet, frame, segment, protocol data unit (PDU), or message as described in or related to any one of the first thru twenty-first examples, or portions or parts thereof, or otherwise described in the present disclosure.

A forty-first example can include a signal encoded with data as described in or related to any one of the first thru twenty-first examples, or portions or parts thereof, or otherwise described in the present disclosure.

A forty-second example can include a signal encoded with a datagram, packet, frame, segment, protocol data unit (PDU), or message as described in or related to any one of the first thru twenty-first examples, or portions or parts thereof, or otherwise described in the present disclosure.

A forty-third example can include an electromagnetic signal carrying computer-readable instructions, wherein execution of the computer-readable instructions by one or more processors is to cause the one or more processors to perform the method, techniques, or process as described in or related to any one of the first thru twenty-first examples, or portions thereof.

A forty-fourth example can include a computer program comprising instructions, wherein execution of the program by a processing element is to cause the processing element to carry out the method, techniques, or process as described in or related to any one of the first thru twenty-first examples, or portions thereof.

A forty-fifth example can include a signal in a wireless network as shown and described herein.

A forty-sixth example can include a method of communicating in a wireless network as shown and described herein.

A forty-seventh example can include a system for providing wireless communication as shown and described herein.

A forty-eighth example can include a device for providing wireless communication as shown and described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A user equipment (UE), comprising:
radio frequency (RF) circuitry;
a memory; and
processing circuitry configured to execute instructions stored in the memory to cause the UE to:
transmit, via the RF circuitry, a beam report based on a hybrid automatic repeat request (HARQ) process index of an uplink (UL) HARQ process for an autonomous transmission configuration indicator (TCI) state update, wherein the beam report indicates the autonomous TCI state update to change a first TCI state to a second TCI state for a serving cell, and wherein the HARQ process index is predefined or configured via higher layer signaling;
receive a downlink control information (DCI) transmission that schedules a transmission for the UL HARQ process or triggers a re-transmission for the UL HARQ process, wherein the scheduling of the transmission indicates that the beam report was decoded successfully as an acknowledgement (ACK), and the triggering of the re-transmission indicates that the beam report was not decoded successfully as a negative acknowledgement (NACK);
in response to the ACK, transmit the transmission for the UL HARQ process based on the second TCI state of the autonomous TCI state update; and
in response to the NACK, re-transmit the beam report.

2. The UE of claim 1, wherein the processing circuitry is further configured to cause the UE to:
receive the DCI transmission via a physical downlink control channel (PDCCH) based on an ACK radio network temporary identifier (ACK-RNTI) that indicates the ACK or the NACK corresponding to a decoding status of the beam report.

3. The UE of claim 1, wherein the processing circuitry is further configured to cause the UE to:
monitor for the DCI transmission based on an X number of symbols or slots after transmission of the beam report, wherein X is an integer greater than zero that is predefined, configured by a radio resource control (RRC) signaling, or reported by a UE capability.

4. The UE of claim 3, wherein the DCI transmission schedules a physical downlink shared channel (PDSCH) or a physical uplink shared channel (PUSCH), wherein the processing circuitry is further configured to determine the ACK or the NACK based on a bit field of the DCI.

5. The UE of claim 1, wherein the processing circuitry is further configured to cause the UE to:
determine the ACK or the NACK via a dedicated search space (SS) or a dedicated control resource set (CORESET) of a physical downlink control channel (PDCCH), wherein the dedicated SS or the dedicated CORESET is configured per bandwidth part (BWP), per component carrier (CC), or per frequency band.

6. The UE of claim 5, wherein the processing circuitry is further configured to cause the UE to:
monitor the dedicated SS or the dedicated CORESET based on a number of symbols or slots after transmission of the beam report and a timer duration; and
determine the NACK in response to the timer duration expiring before detecting the ACK by decoding a DCI.

7. The UE of claim 1, wherein the processing circuitry is further configured to cause the UE to:
start a timer at X number of symbols or slots after transmission of the beam report, wherein X is an integer greater than zero that is predefined, configured by a RRC signaling, or reported by a UE capability; and
reset the timer in response to receiving a physical downlink control channel (PDCCH) to trigger a retransmission for the beam report or an aperiodic beam report.

8. The UE of claim 1, wherein the processing circuitry is further configured to cause the UE to:
transmit the beam report via a medium access control (MAC) control element (MAC CE) by at least one of: a periodic transmission, a semi-persistent transmission, or an aperiodic transmission.

9. The UE of claim 1, wherein the processing circuitry is further configured to cause the UE to:

activate the second TCI state of the autonomous TCI state update in response to determining the ACK based on an action delay of N symbols or slots, wherein N is an integer greater than zero that is predefined, configured by an RRC signaling, or reported by a UE capability.

10. The UE of claim 1, wherein the processing circuitry is further configured to cause the UE to:

in response to more than one reference signal (RS) corresponding to a TCI state, measure and report a beam quality for the TCI state based on the RS that provides a quasi co-location (QCL)-TypeD indication.

11. The UE of claim 1, wherein the processing circuitry is further configured to cause the UE to:

configure the beam report based on one or more measurements of least one of: a synchronization signal block (SSB) or a channel state information reference signal (CSI-RS), wherein the beam report comprises at least one of: an SSB resource index (SSBRI) associated with the SSB or a CSI-RS resource index (CRI) associated with the CSI-RS, and one or more beam qualities corresponding to the at least one of: the SSBRI or the CRI.

12. The UE of claim 1, wherein the beam report includes an indication whether the beam report is associated with an UL TCI update, a downlink (DL) TCI update, or both the UL TCI update and the DL TCI update per reported beam or per report instance of the beam report.

13. A base station comprising:

radio frequency (RF) circuitry;

a memory; and processing circuitry configured to execute instructions stored in the memory to cause the base station to:

receive a beam report from a user equipment (UE) indicating an autonomous transmission configuration indicator (TCI) state update from a first TCI state to a second TCI state based on a hybrid automatic repeat request (HARQ) process index of an uplink (UL) HARQ process for the autonomous TCI state update, wherein the HARQ process index is predefined or configured via higher layer signaling;

transmit, via the RF circuitry, a downlink control information (DCI) transmission that schedules a transmission for the UL HARQ process or triggers a re-transmission for the UL HARQ process, wherein the scheduling of the transmission indicates that the beam report was decoded successfully as an acknowledgement (ACK), and the triggering of the re-transmission indicates that the beam report was not decoded successfully as a negative acknowledgement (NACK);

in response to indicating the ACK, monitoring for the transmission for the UL HARQ process based on the second TCI state; and in response to indicating the NACK, monitoring for a re-transmission of the beam report based on the first TCI state.

14. The base station of claim 13, wherein the processing circuitry is further configured to cause the base station to:

transmit the DCI transmission based on a radio network temporary identifier (RNTI) specific to indicating the ACK or the NACK, wherein the RNTI is predefined or configured via a radio resource control (RRC) signaling.

15. The base station of claim 13, wherein the processing circuitry is further configured to cause the base station to:

monitor a physical uplink control channel (PUCCH) or a physical uplink shared channel (PUSCH) based on X number of symbols or slots after transmission of the beam report before transmitting the DCI, wherein the DCI is configured to schedule a physical downlink shared channel (PDSCH) or the PUSCH, and wherein X is an integer greater than zero that is predefined, configured by a radio resource control (RRC) signaling, or reported by a UE capability.

16. The base station of claim 13, wherein the processing circuitry is further configured to cause the base station to:

transmit the DCI in a dedicated search space (SS) or a dedicated control resource set (CORESET) via an old beam or a beam selected from the beam report, wherein the dedicated SS or the dedicated CORESET is configured per bandwidth part (BWP), per component carrier (CC) or per frequency band.

17. The base station of claim 13, wherein the processing circuitry is further configured to cause the base station to:

receive the beam report based on a medium access control (MAC) control element (MAC CE) or other type of uplink transmission based on a channel state information report (CSI) report configuration (CSI-reportConfig) that indicates whether the beam report is transmitted based on the MAC CE or the other type of the uplink transmission.

18. The base station of claim 13, wherein the processing circuitry is further configured to cause the base station to:

in response to the beam report being associated with a plurality of beams, provide the ACK with a beam based on a beam quality from the plurality of beams associated with the beam report, wherein the beam report includes a TCI index and a beam quality associated with the beam of the plurality of beams.

19. The base station of claim 13, wherein the processing circuitry is further configured to cause the base station to:

receive the beam report comprising different reference signals (RSs) that are associated with a TCI state in the autonomous TCI state update;

determine an updated beam based on a TCI state index associated with the beam report, and at least one of: a highest beam quality among a plurality of beams, a priority order of the plurality of beams, or an indication of the updated beam from a higher layer signaling; and provide the ACK for the updated beam to be activated.

20. The base station of claim 13, wherein the processing circuitry is further configured to cause the base station to:

provide an indication of whether the beam report is to be configured for a downlink (DL) TCI update, an UL TCI update, or both DL TCI update and the UL TCI update to enable the UE to update a TCI state based on the indication.

21. A baseband processor for a user equipment (UE), the baseband processor configured to, when executing instructions stored in a memory, perform operations comprising:

providing, to a radio frequency (RF) interface for transmission, a beam report based on a hybrid automatic repeat request (HARQ) process index of an uplink (UL) HARQ process for an autonomous transmission configuration indicator (TCI) state update, wherein the beam report indicates the autonomous TCI state update for a serving cell, and wherein the HARQ process index is predefined or configured via higher layer signaling;

monitoring for a group-based downlink control information (DCI) transmission including a plurality of acknowledgement (ACK) blocks for a plurality of respective UEs;

determining an ACK or negative acknowledgement (NACK) indicating whether the beam report was decoded, wherein the determination is based on the monitoring and an ACK index corresponding to an ACK block for the UE from the plurality of ACK blocks for the plurality of respective UEs, and wherein the ACK index is configured by higher layer signaling;

in response to determining the ACK, activating a TCI state of the autonomous TCI state update; and in response to determining the NACK, re-transmitting the beam report.

22. The baseband processor of claim 21, wherein the operations further comprise:

receiving the DCI via a physical downlink control channel (PDCCH) based on a radio network temporary identifier (RNTI) specific to indicating the ACK or the NACK, wherein the RNTI is predefined or configured via a radio resource control (RRC) signaling.

23. The baseband processor of claim 21, wherein the operations further comprise:

wherein the DCI schedules a transmission for the UL HARQ process based on the beam report or triggers a re-transmission for the UL HARQ process, wherein a scheduling of the transmission based on an updated TCI of the beam report indicates that the beam report is decoded successfully as the ACK, and the triggering of the re-transmission indicates that the beam report is not decoded successfully as the NACK.

* * * * *